(12) United States Patent
Okamoto et al.

(10) Patent No.: US 6,430,362 B1
(45) Date of Patent: Aug. 6, 2002

(54) DIGITAL VIDEO SIGNAL RECORDING/REPRODUCING METHOD AND APPARATUS

(75) Inventors: Hiroo Okamoto; Nobutaka Amada; Kyoichi Hosokawa, all of Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/059,355

(22) Filed: Apr. 14, 1998

(30) Foreign Application Priority Data

Apr. 15, 1997 (JP) .............................. 9-096915
Aug. 20, 1997 (JP) .............................. 9-223344

(51) Int. Cl.[7] .................... H04N 5/783; H04N 5/917
(52) U.S. Cl. ........................................ 386/112; 386/68
(58) Field of Search .................... 386/109, 111, 386/112, 68, 124, 81, 82, 46, 27, 33, 40, 1, 6, 69; H04N 5/783, 5/917

(56) References Cited

U.S. PATENT DOCUMENTS

| | | | |
|---|---|---|---|
| 5,282,049 A | * 1/1994 | Hatakenaka et al. | 386/68 |
| 5,377,051 A | * 12/1994 | Lane et al. | 386/68 |
| 5,596,581 A | 1/1997 | Saeijs et al. | 370/394 |

FOREIGN PATENT DOCUMENTS

| | | |
|---|---|---|
| EP | 0 712 257 A2 | 5/1996 |
| EP | 0712257 A2 * | 5/1996 |
| EP | 0 763 947 A2 | 3/1997 |
| GB | 2 295 066 A | 5/1996 |
| JP | A-140030 | 5/1996 |
| JP | 08273305 | 10/1996 |

* cited by examiner

*Primary Examiner*—Robert Chevalier
(74) *Attorney, Agent, or Firm*—Antonelli, Terry, Stout & Kraus, LLP

(57) ABSTRACT

An object of the present invention is to provide a digital signal recording method and a digital signal recording apparatus, capable of readily producing a signal used to reproduce in a trick play mode from a digital compression video signal. The above-described object of the present invention may be achieved by such a digital video signal recording method for recording a first compression frame signal compressed without using a correlation between frames, and a digital compression video signal having preselected bytes of a packet format constituted by a second compression frame signal compressed with using the correlation between the frames, in which a third signal made of a packet containing the first compression frame signal is produced, and then is recorded in combination with the packet of the digital compression signal.

26 Claims, 22 Drawing Sheets

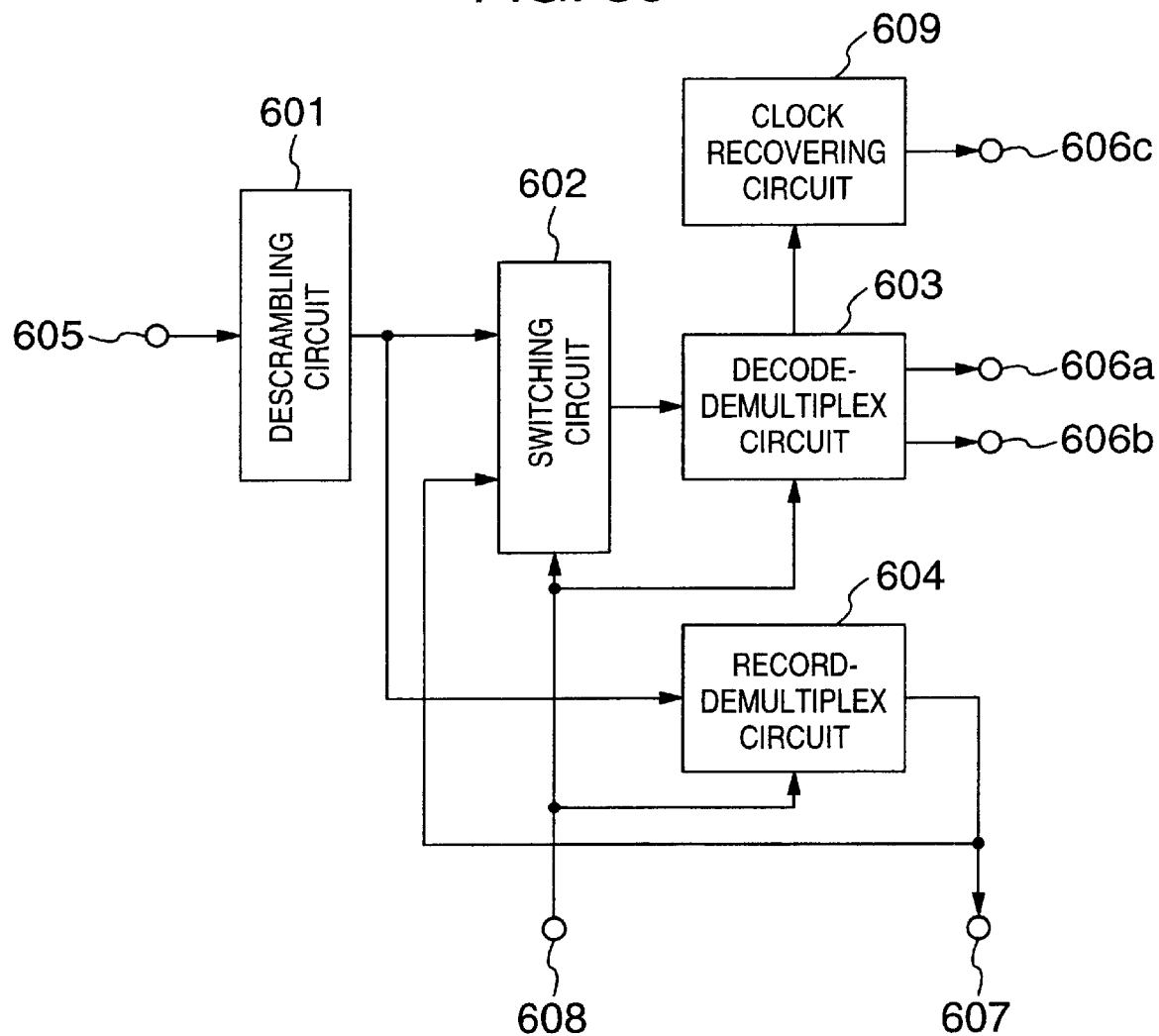

DIGITAL VIDEO SIGNAL RECORDING/ REPRODUCING METHOD AND APPARATUS

BACKGROUND OF THE INVENTION

1. Field of the Invention

The present invention generally relates to a digital video signal recording and/or reproducing method, and a digital video signal recording and/or reproducing apparatus for recording and/or reproducing a digital video signal. More specifically, the present invention is directed to a method and an apparatus capable of recording and/or reproducing a digital compression video signal.

2. Description of the Related Art

The digital signal recording/reproducing apparatus for recording the digital compression video signal on the magnetic tape with employment of the rotary head is described in JP-A-8-273305. In this digital signal recording/ reproducing apparatus, the digital compression video signal made in the packet format is subdivided based on a preselected byte number, and each of these packets is constructed of n bytes. Then, the sync (synchronization) signal, the identification information, and the error detection/correction code are added to the divided digital compression video signals to thereby constitute the block form. The digital signal recording region is formed by a preselected number of blocks to be recorded on the magnetic recording medium. Also, JP-A-8-273305 describes that the signal used to reproduce in the trick play mode is recorded as the digital compression video signal in this digital signal recording/ reproducing apparatus.

However, in the case of the digital compression video signal by using a correlation between the frames, there are the following problems. That is, the video signal can be hardly decoded by simply deriving a portion of the data. Furthermore, the signal used to reproduce in the trick play mode can be hardly produced by simply deriving a portion of the data.

Also, since the head trace is not made coincident with the recording track during the trick-play reproducing operation, there is another problem. That is, it is practically difficult to discriminate the signal used to reproduce in the trick play mode from other digital video signals.

SUMMARY OF THE INVENTION

An object of the present invention is to provide a digital signal recording method and a digital signal recording apparatus, capable of readily producing a signal used to reproduce in a trick play mode from a digital compression video signal.

Another object of the present invention is to provide a digital signal recording method and a digital signal reproducing apparatus, capable of easily discriminating a signal used to reproduce in a trick play mode from other digital video signals.

A further object is to provide a digital signal reproducing method, a digital signal reproducing apparatus, and a digital signal decoding apparatus, capable of switching the normal reproducing operation and the trick-play reproducing operation.

The above-described object of the present invention may be achieved by such a digital video signal recording method for recording a first compression frame signal compressed without using a correlation between frames, and a digital compression video signal having preselected bytes of a packet format constituted by a second compression frame signal compressed with using the correlation between the frames, in which a third signal made of a packet containing the first compression frame signal is produced, and then is recorded in combination with the packet of the digital compression signal.

Another object of the present invention may be achieved by such a digital video signal recording method for recording on a magnetic recording medium by using a rotary head, a first compression frame signal constructed of a picture compressed without using a correlation between frames; a digital compression video signal having a preselected bytes of a packet format constituted by a second compression frame signal made of a picture compressed with using the correlation between the frames; and a third signal made of a packet containing said first compression frame signal; in which information indicative of an arrangement condition of signals is added to the third signal, and the resultant third signal is recorded on a predetermined region of a track on the recording medium.

The further object of the present invention may be achieved by such a digital video signal reproducing method for reproducing a first digital video signal constituted by a picture signal which has been recorded on a recording medium and compressed without using a correlation between frames and by another picture signal compressed by using the correlation between the frames; and a second signal produced from a picture signal compressed without using the correlation between the frames contained in the first digital video signal, in which:

the digital video signal reproducing method contains a first mode for reproducing the first digital video signal and a second mode for reproducing the second signal; in the first mode, the reproduced first digital video signal is outputted at the same timing during the recording operation; and in the second mode, the reproduced second signal is outputted at predetermined timing different from that of the recording operation.

BRIEF DESCRIPTION OF THE DRAWINGS

For a better understanding of the present invention, reference is made of a detailed description to be read in conjunction with the accompanying drawings, in which:

FIG. 36 is a schematic block diagram for denoting a selecting circuit.

DETAILED DESCRIPTION OF THE PREFERRED EMBODIMENTS

Referring now to drawings, various embodiments according to the present invention will be described.

Figure 1:
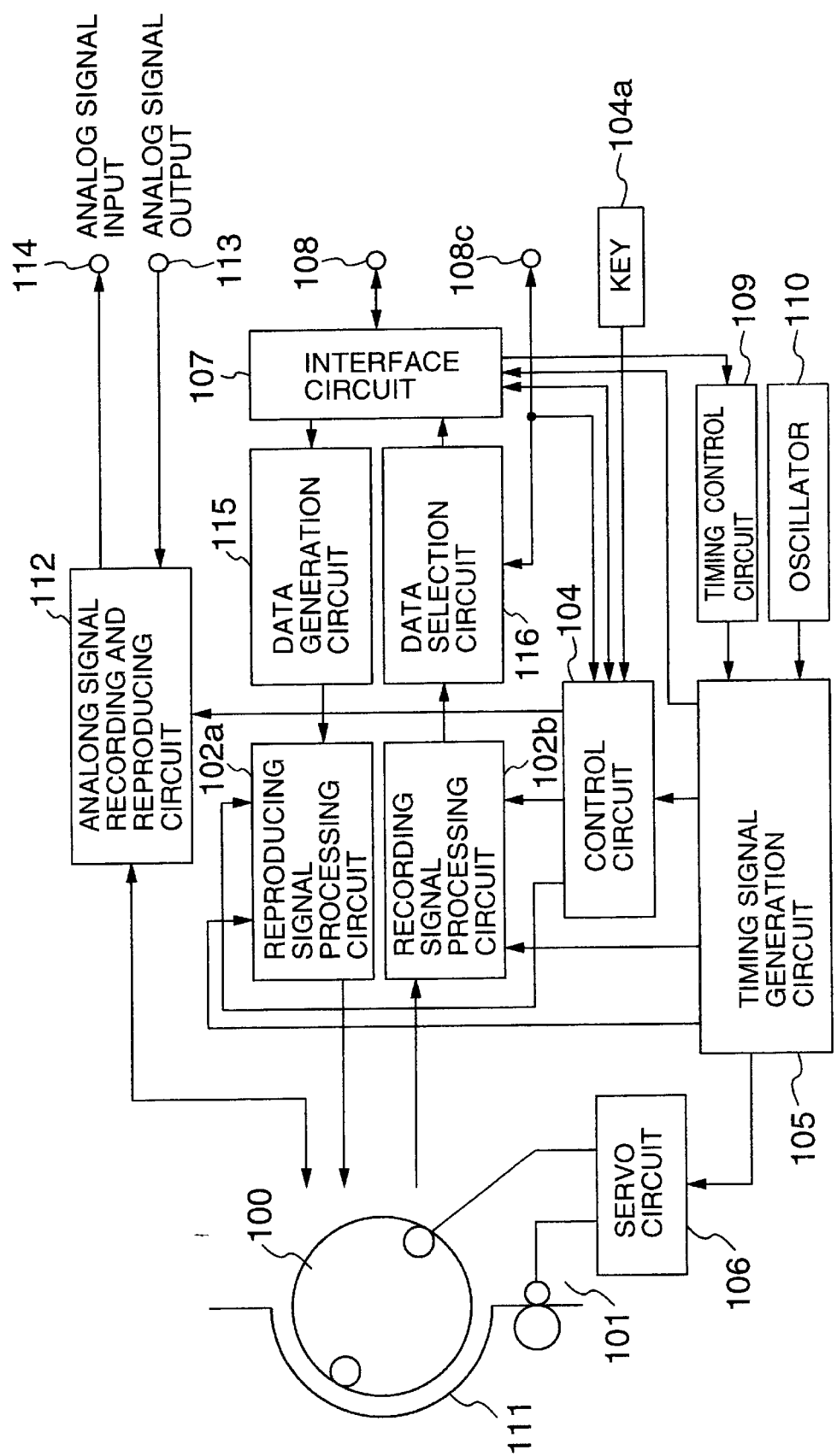
FIG. 1 schematically shows an arrangement diagram of a digital signal recording/reproducing apparatus according to an embodiment of the present invention.

FIG. 1 is a schematic block diagram for representing an arrangement of a digital signal recording/reproducing apparatus. It should be understood that although this apparatus is commonly capable of recording and also reproducing the digital signal, this apparatus may separately record and reproduce the digital signal. In this drawing, reference numeral 100 shows a rotary head, reference numeral 101 indicates a capstan, reference numeral 102a represents a recording signal processing circuit for producing a recording signal used during a recording operation, and reference numeral 102b indicates a reproducing signal processing circuit for demodulating a reproducing signal used during a reproducing operation. Also, reference numeral 104 is a control circuit such as a microprocessor for executing a control operation of a recording/reproducing mode, reference numeral 104a shows a key for controlling operations of the recording/reproducing apparatus, reference numeral 105 shows a timing signal generating circuit for generating a timing signal which constitutes a basic signal of rotations of the rotary head 100, reference numeral 106 shows a servo circuit for controlling feed speeds of the rotary head and a tape, and reference numeral 107 is an input/output circuit for inputting the recording signal or outputting the reproducing signal. Further, reference numeral 109 indicates a timing control circuit for controlling the timing during the recording operation, reference numeral 40 indicates an oscillator for producing a reference clock, reference numeral 111 represents a tape, reference numeral 112 denotes an analog video signal recording/reproducing circuit, reference numeral 115 indicates a data generating circuit used when the digital signal is recorded, and reference numeral 116 denotes a data selecting circuit used when the digital signal is reproduced.

Figure 2:
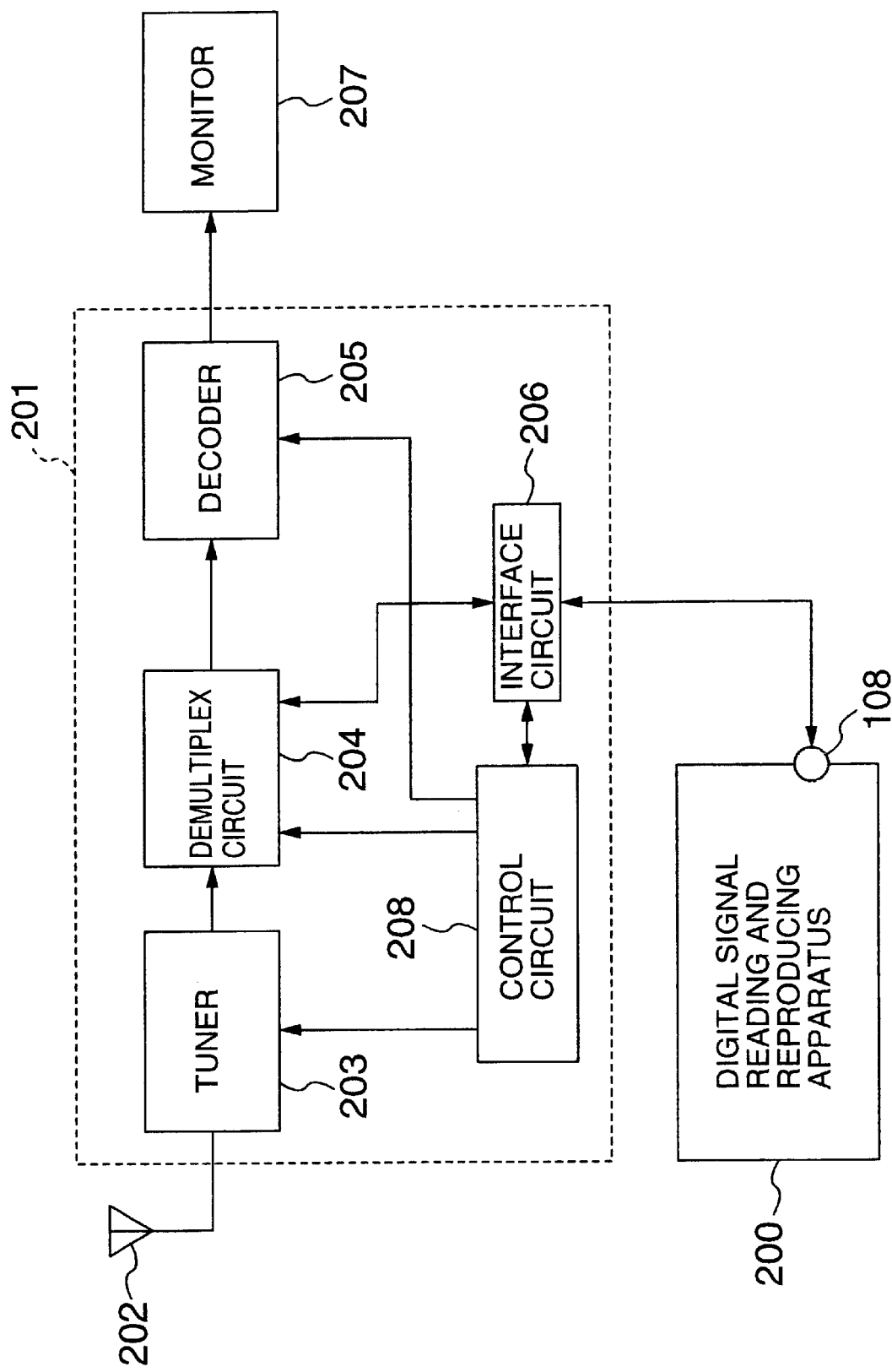
FIG. 2 schematically indicates a structural diagram of a digital broadcasting receiver connected to the digital signal recording/reproducing apparatus of FIG. 1.

FIG. 2 is a schematic block diagram for indicating a structural example of a digital broadcasting receiver connected to the digital signal recording/reproducing apparatus shown in FIG. 1. In this drawing, reference numeral 200 shows the digital signal recording/reproducing apparatus of FIG. 1, reference numeral 201 represents a digital broadcasting receiver, reference numeral 202 is an antenna, and reference numeral 207 denotes a monitor. Also, reference numeral 203 shows a tuner, reference numeral 204 is a demultiplex circuit, reference numeral 205 shows a decoder, reference numeral 206 is an interface circuit, reference numeral 208 represents a control circuit for controlling operations of the digital broadcasting receiver 201.

A digital compression video signal corresponds to data with a packet format. Signals in plural channels are multiplexed in a time divisional manner, and a signal multiplexed by the time divisional manner is transmitted. A digital broadcasting signal received by the antenna 202 is demodulated by the tuner, and thereafter the demodulated digital broadcasting signal is entered into the demultiplex circuit 204. In the demultiplex circuit 204, a necessary digital compression video signal is selected. The selected digital compression video signal is decoded by the decoder 205 to produce the normal video signal which will then be outputted to the monitor 207. It should be noted when the reception signal is scramble-processed, after this scrambled signal is released by the demultiplex circuit 204, the decoding process is carried out for the descrambled signal. When the recording operation is performed, both a digital compression video signal to be recorded and relevant information are selected in the demultiplex circuit 204, and then are outputted from the interface circuit 206 to the input/output terminal 108 of the digital signal recording/reproducing apparatus 200. Then, these digital compression video signal and relevant information are inputted from the input/output terminal 108 into the digital signal recording apparatus 200 so as to be recorded therein. Also, a digital compression video signal and the like, which are reproduced by the digital signal recording/reproducing apparatus 200 are outputted from the input/output terminal 108 to the interface circuit 206. In the interface circuit 206, the inputted signal is entered into the demultiplex circuit 204, and a similar process operation to that of the normal reception is carried out for this entered signal, and then the processed signal is outputted to the monitor 207.

In the digital signal recording/reproducing apparatus 200, when the recording operation is performed, a portion of packet data entered from the input/output terminal 108 is inputted via the input/output circuit 107 (FIG. 1) to the control circuit 104. The control circuit 104 detects a sort of the packet data based on either information added to this packet data or information separately sent with respect to the packet data, judges a recording mode based upon the detection result, and sets operation modes of the recording signal processing circuit 102a and the servo circuit 106. The input/output circuit 107 outputs the packet data to be recorded to the data generating circuit 115. The data generating circuit 115 generates data used in trick-play reproducing operation, and adds this data to the packet data, and then outputs this added packet data to the recording signal processing circuit 102a. In response to the recording mode judges by the control circuit 104, the recording signal processing circuit 102a produces an error correction code, ID information, and a subcode, and also produces a recording signal which will then be recorded on the tape 111 by the rotary head 100.

When the reproducing operation is carried out, this reproducing operation is first performed in an arbitrary reproduction mode, and then the ID information is detected by the reproducing signal processing circuit 102b. Then, the control circuit 104 judges as to which mode is used to record the digital compression video signal to thereby again set the operation modes of the reproducing signal processing circuit 102b and the servo circuit 106. Then, the control circuit 104 judges as to whether the normal reproducing operation, or the trick-play reproducing operation is carried out based on the control signal which is entered from the key 104a, or via a control input/output terminal 108c (FIG. 1) from the digital broadcasting receiver 201 (FIG. 2). Thus, the reproducing signal processing circuit 102b executes the reproducing operation based on the judgement result. The reproducing signal processing circuit 102b detects the sync signal and executes the error detection/correction based on a reproducing signal reproduced from the rotary based 100, and reproduces data to output the reproduced data to the data selecting circuit 116. The data selecting circuit 116 selects the data recorded in the normal recording region during the normal reproducing operation, and selects the trick-play data during the trick-play reproducing operation, and then outputs the selected data to the input/output circuit 107. It should be understood that when the sequence of the data is not correctly reproduced during the trick-play reproducing operation, this sequence is rearranged and the rearranged sequence is outputted. In the input/output circuit 107, the reproduced data is outputted from the input/output terminal 108 on the basis of the timing signal produced in the timing signal generating circuit 105. Under control of the control circuit 104, the servo circuit 106 travels the tape 111 at the same speed as in the recording operation during the normal reproducing operation, and also travels the tape 111 at a different speed from the tape travel speed during the trick-play reproducing operation, for example, +7 times higher, or −7 times lower than the tape travel speed during the recording operation. Apparently, the trick-play reproducing operation may be realized by employing a plurality of reproducing modes with the different reproducing speeds.

During the recording operation, while using the rate of the recording data entered from the input/output terminal 108 as a reference, the operation timing of the recording/reproducing apparatus is controlled by the timing control circuit 109. During the reproducing operation, while using the clock oscillated from the oscillator 110 as an operation basis, the reproducing operation is carried out.

In the case that an analog video signal is recorded and reproduced, during the recording operation, the analog video signal entered from the input terminal 113 is processed in a predetermined process operation by the analog signal recording/reproducing circuit 112 and then the processed analog signal is recorded on the tape 111 by the rotary head 100, whereas during the reproducing operation, after a video signal reproduced by the rotary head 100 is processed in a predetermined process operation by the analog signal recording/reproducing circuit 112, the processed analog signal is outputted from the output terminal 114. In this case, although not shown in the drawing, the servo circuit 106 is controlled by using the frame time period of the analog video signal as a reference. It should be noted that the analog signal recording head may be commonly used as the digital signal recording head, or a digital signal recording head may be independently provided with the analog signal recording head.

Figure 3:
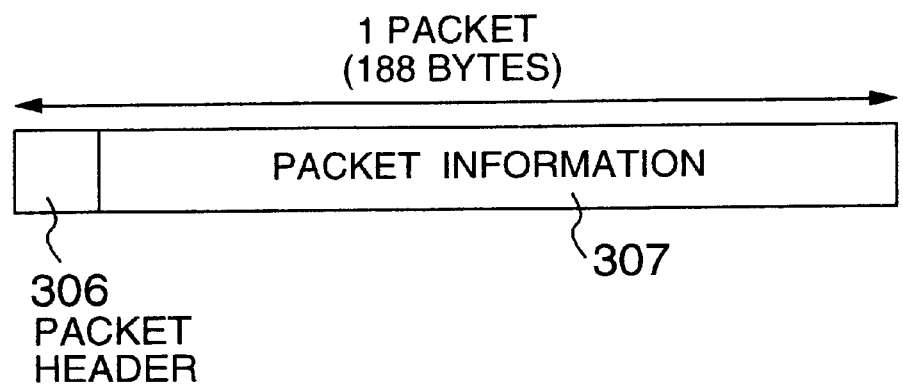
FIG. 3 shows a structural diagram of a packet of a digital compression video signal.

FIG. 3 schematically shows a structure of a packet of a digital compression video signal. One packet is constructed of a fixed length, for example, 188 bytes, and is arranged by a 4-byte packet header 306 and 184-byte packet information 307. A digital compression video signal is arranged in the region of the packet information 307. Also, the packet header 306 is constructed of information such as sorts of the packet information.

Figure 4:
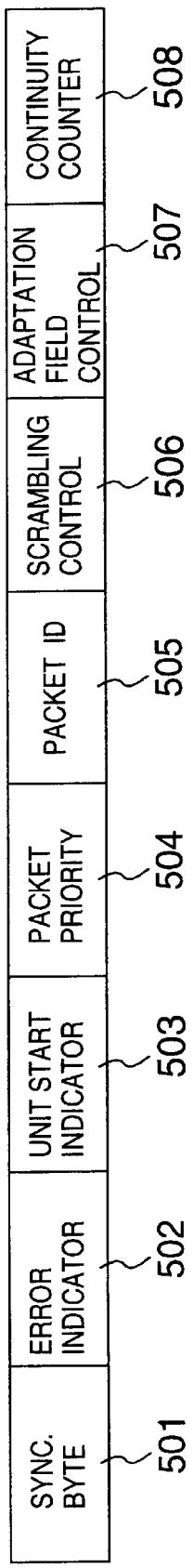
FIG. 4 represents a structural diagram of a packet header.

FIG. 4 schematically indicates a structure of the packet header 306. In this drawing, reference numeral 501 shows a sync byte indicative of a head of the packet, reference numeral 502 denotes an error indication for indicating whether or not an error happens to occur, reference numeral 503 represents a unit starting indication for indicating a start of a unit, reference numeral 504 shows a packet priority for indicating a priority degree of the packet, and reference numeral 505 shows a packet ID for representing a sort of the packet. Also, reference numeral 506 denotes a scrambling control, for indicating whether or not a scramble is present, reference numeral 507 shows an adaptation field control for indicating whether or not additional information is present and whether or not packet information is present, and reference numeral 508 represents a continuity counter counted up in unit of a packet.

Figure 5A:
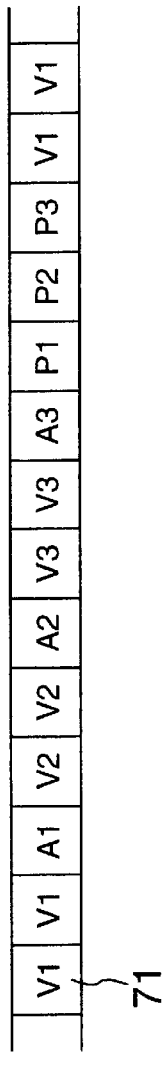
FIGS. 5A to 5C indicates a structural diagram of a transmission signal used in the digital broadcasting system.

FIG. 5A schematically shows a structure of a transmission signal of the digital broadcasting system. In this drawing, reference numeral 71 shows the packet of FIG. 3. Normally, an audio signal and information related to a program are added to the above-described video signal, and programs of plural channels are multiplexed in the time divisional multiplexing manner, and then the multiplexed program is transmitted. FIG. 5A indicates such an example that programs of three channels are multiplexed. Symbols "V1", "A1", and "P1" indicate a video signal, an audio signal, and program information of a first channel. Symbols "V2", "A2", and "P2" show a video signal, an audio signal, and program information of a second channel. Symbols "V3", "A3", and "P3" indicate a video signal, an audio signal, and program information of a third channel. The packet IDs 505 different from each other are allocated to the respective packets, so that the contents of these packets can be discriminated from each other. Alternatively, a total number of channels to be multiplexed may be selected to be any numbers other than 3 channels, instance, 4 channels. Also, other information may be apparently multiplexed.

Figure 5B:
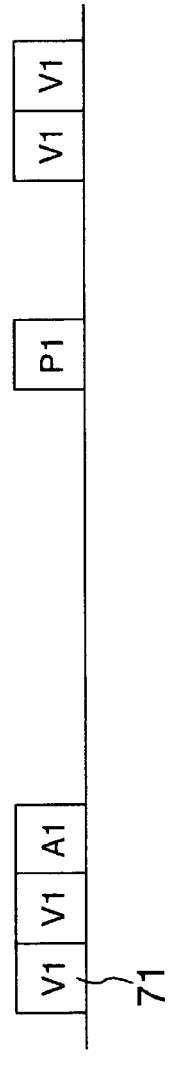

FIG. 5B shows another structure of a transmission signal produced by selecting only the information of the first channel from the structure of FIG. 5A. When information of a first channel is recorded, this information is outputted from the digital broadcasting receiver 201 to the recording/reproducing apparatus 200. Apparently, any information other than this information of the first channel is involved in this information, which may be recorded. Alternatively, a portion of the packet, such as the header information, may be changed in order to readily execute the process operation during the reproducing operation.

Figure 5C:
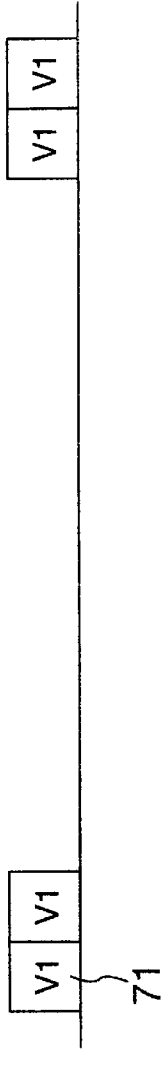

FIG. 5C indicates another structure of a transmission signal produced by selecting only the video signal of the first channel from the structure of FIG. 5A. The data used in the trick-play reproducing operation is produced from this video signal packet.

Figure 6:
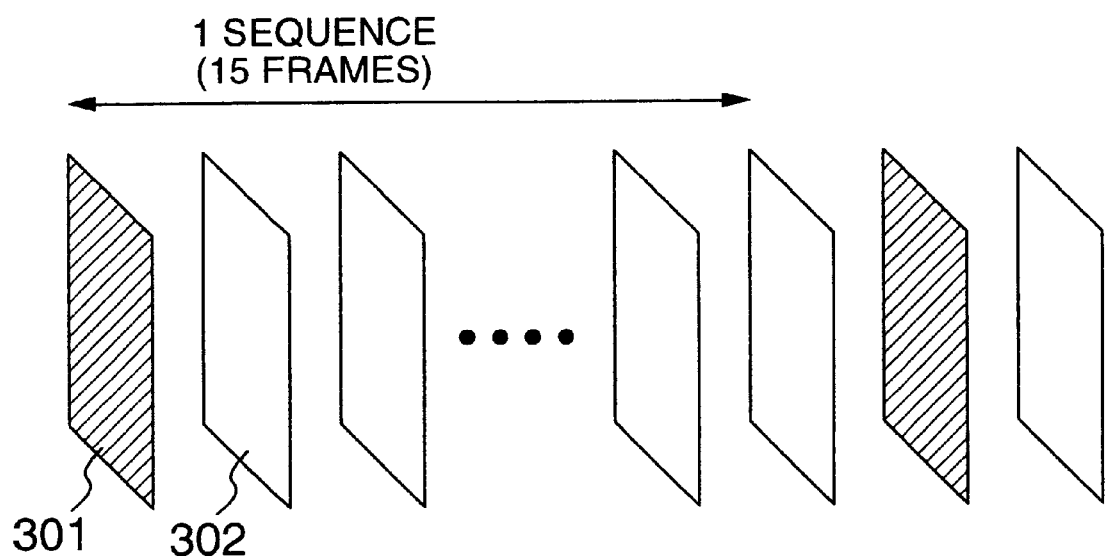
FIG. 6 illustratively shows a relationship between intraframe data and interframe data of a digital compression video signal.

FIG. 6 schematically represents a relationship between intraframe data and interframe data of a digital compression video signal. The intraframe data is compressed in the unit of the frame of the digital compression video signal. The interframe data is produced by compressing only differential information by using a prediction obtained from data in a preceding frame and data in a succeeding frame. Symbol 301 is an intraframe, and symbol 302 is an interframe. In the digital compression video signal, a preselected number of frames, e.g., 15 frames are used as one sequence, in which a head of a group is set as an intraframe, and the remaining frames are set as an interframe compressed by using a prediction obtained from the intraframe. Apparently, the intraframe may be arranged at any position other than the head.

Figure 7:
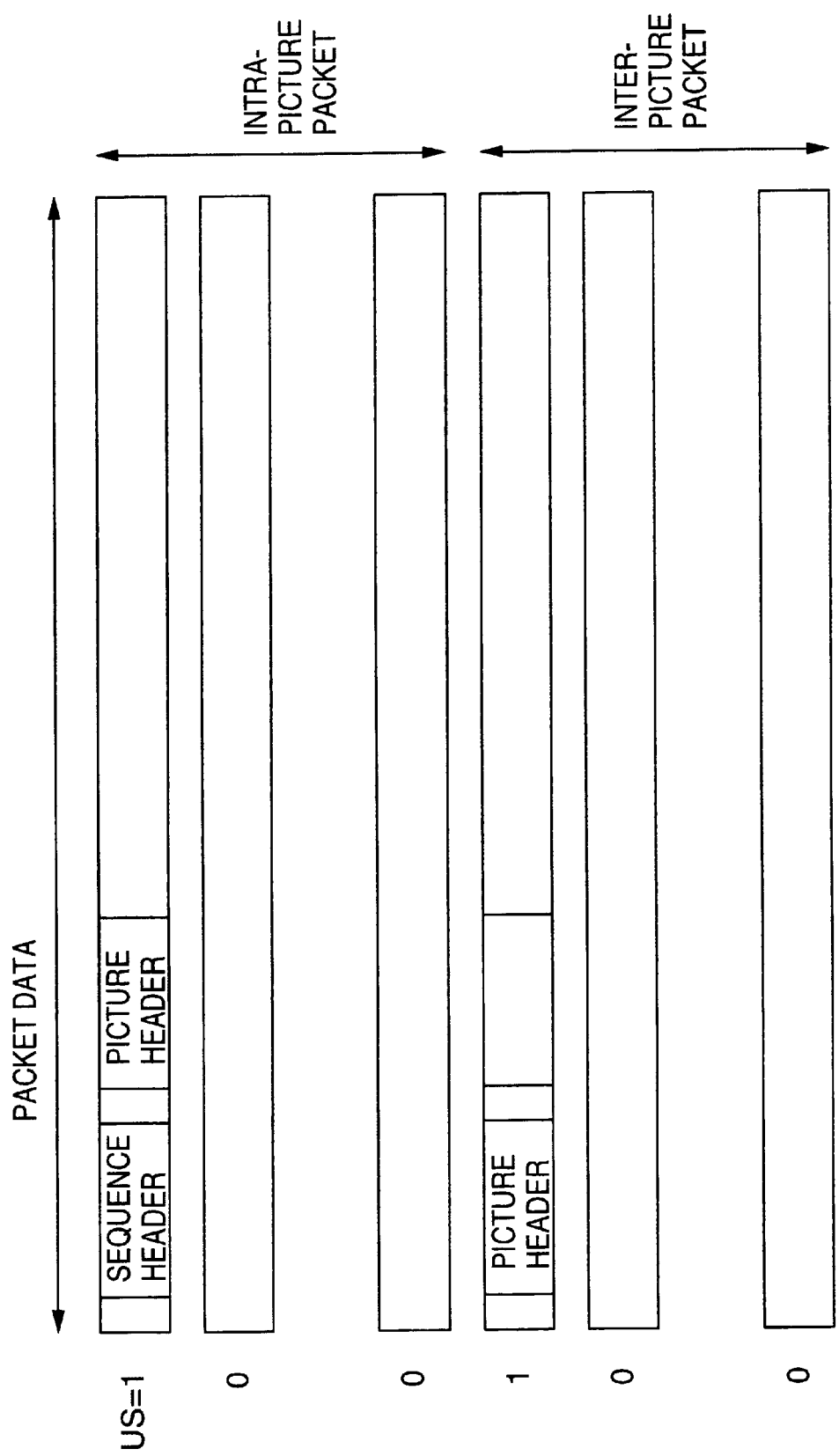
FIG. 7 schematically indicates a structural diagram of 1 sequence of a digital compression video signal.

FIG. 7 schematically shows a structure of 1 sequence of a digital compression video signal. A picture header is added in unit of a frame to the digital compression video signal, and sequence header is added in unit of a sequence thereto. The sequence header is constructed of a sync signal, and information such as a transfer rate. The picture header is constituted by a sync signal, and discrimination information for discriminating the intraframe from the interframe. Normally, a length of data of each picture is changed in response to an information amount. It should also be noted that in the example of FIG. 7, data of one picture is completed in unit of a packet, and a packet of a head of the picture is made in such a manner that a unit starting indication (US) becomes 1. With employment of such a structure, the head of the picture can be discriminated by the unit starting indication.

Next, a description will now be made of a recording method to the magnetic tape.

Figure 8:
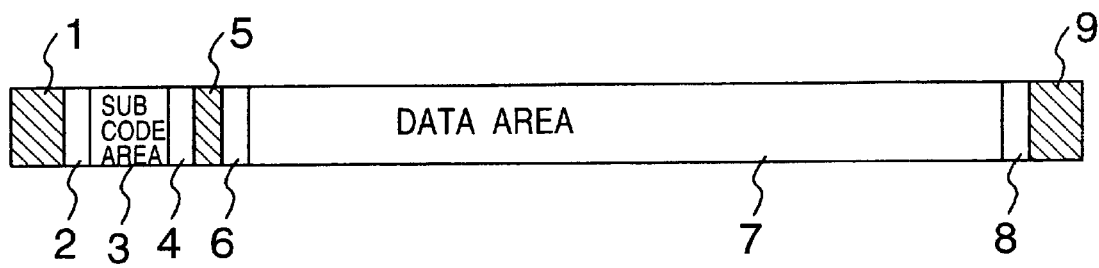
FIG. 8 schematically shows a recording pattern diagram of 1 track.

FIG. 8 schematically indicates a recording pattern of 1 track. In this drawing, reference numeral 3 shows a subcode recording area for recording a subcode such as time information and program information, reference numeral 7 shows a data recording area for recording a digital compression video signal, reference numerals 2 and 6 are preambles of the respective recording areas, and reference numerals 4 and 8 denote postambles of the respective recording areas. Also, reference numeral 5 is a gap between the respective recording areas, and reference numerals 1 and 9 show margins positioned at track ends. Since the postamble, the preamble, and the gap are formed in the respective recording areas in the above-described manner, afreco (after recording) can be independently made in the respective areas. Apparently, another digital signal other than the digital compression video signal may be recorded on the data recording area 7.

Figure 9:
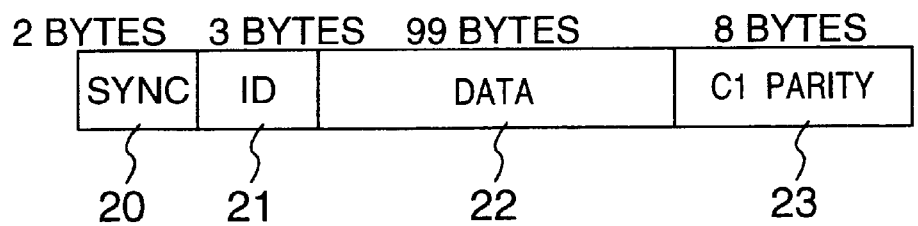
FIG. 9 schematically represents a block structural diagram of a data recording region.

FIG. 9 schematically indicates a block structure of the data recording area 7. In this drawing, reference numeral 20 indicates a sync signal, reference numeral 21 indicates ID information, reference numeral 22 represents data, and reference numeral 23 denotes a parity (C1 parity) for a first error detection/correction. For example, the sync signal 20 is constructed of 2 bytes, the ID information 21 is constructed of 3 bytes, the data 22 is constructed of 99 bytes, the parity 23 is constructed of 8 bytes, and 1 block is arranged by 112 bytes.

Figure 10:
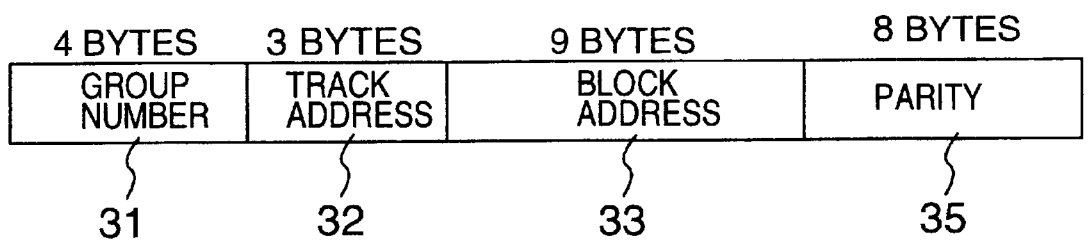
FIG. 10 schematically indicates a structural diagram of ID information.

FIG. 10 schematically shows a structure of the ID information 21. In this drawing, reference numeral 31 is a group number, reference numeral 32 indicates a track address, reference numeral 33 indicates a block address within 1 track, and reference numeral 35 is a parity used to detect errors contained in the group number 31, the track address 32, and the block address 33. The block address 33 is an address for discriminating blocks in the respective recording areas. For instance, in the data recording area 7, the block addresses are selected to be 0 to 335. The track address 32 is such an address used to discriminate the track. For example, the address is changed in unit of 1 track, or 2 tracks, and the track addresses are selected to be 0 to 5, or 0 to 2, so that 6 tracks can be discriminated. The group number 31 is changed in the unit of, for example, 6 tracks discriminated by the track address 32. Then, the group number 31 is selected to be 0 to 15, so that 96 tracks can be discriminated from each other.

Figure 11:
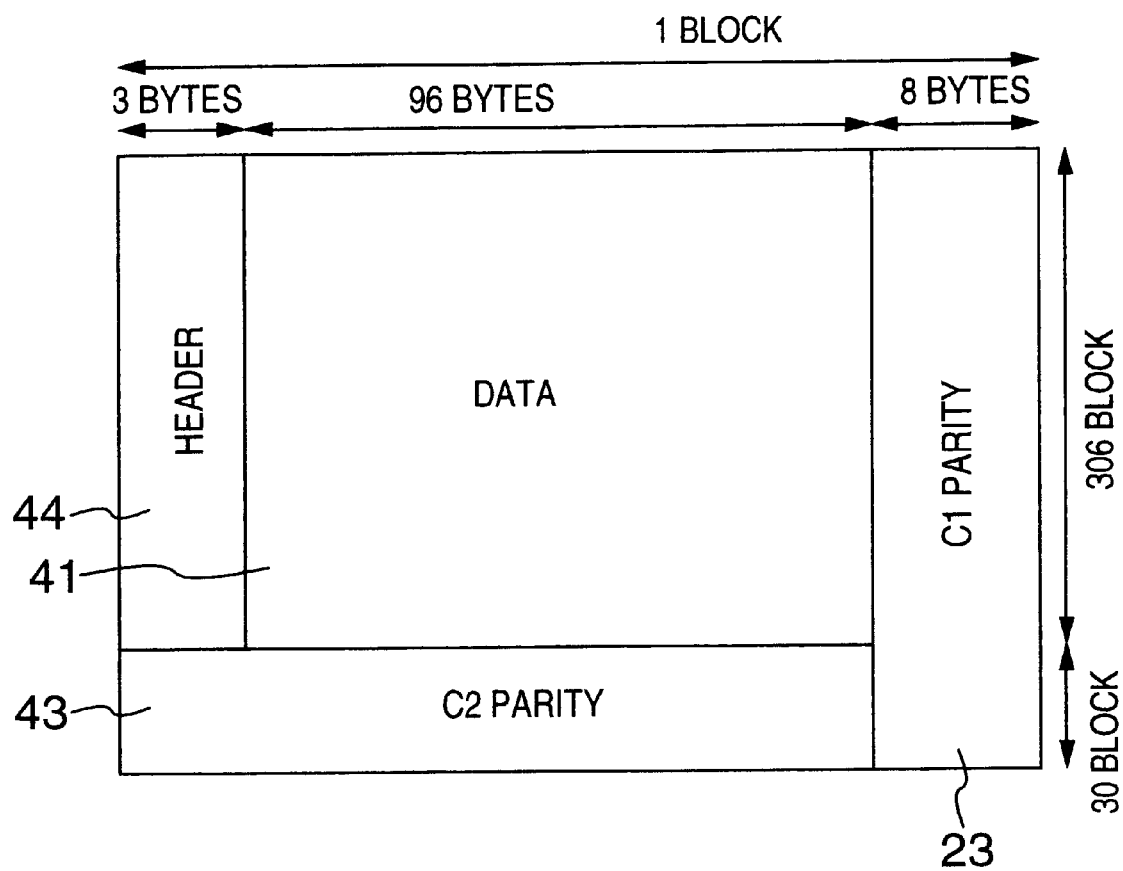
FIG. 11 schematically represents a data structural diagram of 1 track in a data recording region.

FIG. 11 schematically shows a data structure of 1 track in the data recording area 7. It should be understood that both the sync signal 20 and the ID information 21 are omitted. The data recording area 7 is constructed of 336 blocks. The data 41 is recorded on the first 306 blocks, and a second error correction code (C2 parity) 43 is recorded on the next 30 blocks. As to the C2 parity 43, for example, data of 306 blocks×6 tracks is subdivided by 18 in the unit of 6 tracks, and the C2 parity of 10 blocks is added to each of the 102 blocks. As the error correction code, for instance, the Reed-Solomon code may be employed. The 99-byte data of each block is arranged by a 3-byte header 44 and 96-byte data 41.

Figure 12:
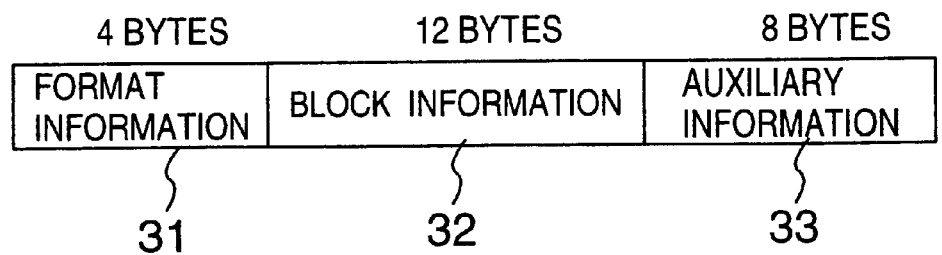
FIG. 12 schematically shows a header structural diagram of the data recording region.

FIG. 12 schematically shows a structure of the header 44 of the data recording area 7. The header 44 is constituted by format information 31, block information 32, and auxiliary information 33. The format information 31 is such information related to a recording format, and for example, one piece of information is constructed of 6bytes of 6 blocks. The block information 32 corresponds to information used to discriminate a sort of data recorded on a data recording area 41.

Figure 13:
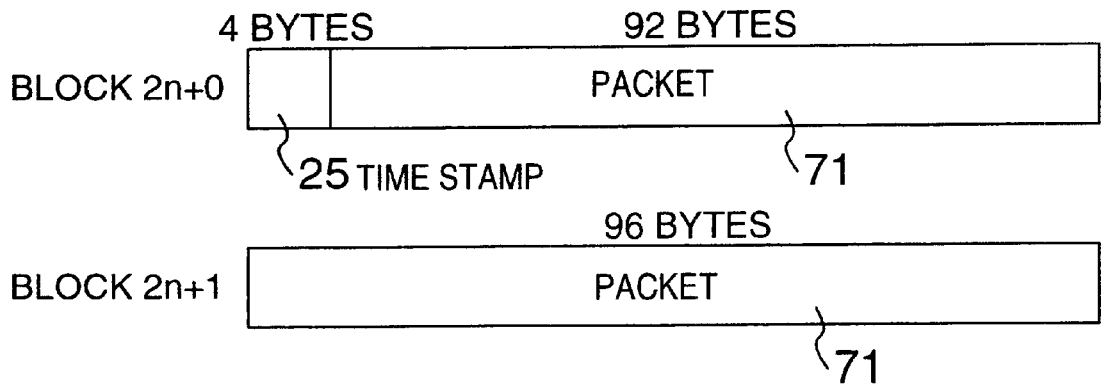
FIG. 13 schematically indicates a structural diagram of a block in the case that a digital compression video signal transmitted in a 188-byte packet format is recorded on a data recording region.

FIG. 13 schematically represents a structural example of a block in such a case that a digital compression video signal transmitted in a 188-byte packet format is recorded on the data recording area 41. In this case, while a 4-byte time stamp 25 is added to become 192 bytes, 1 packet is recorded on 2 blocks.

Figure 14:
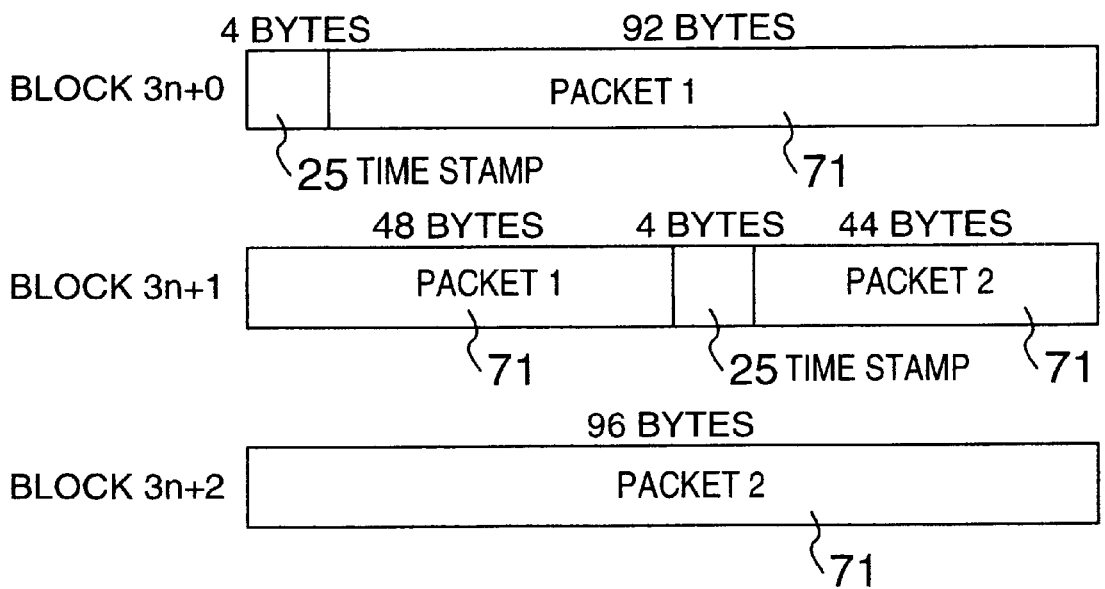
FIG. 14 schematically shows a structural diagram of a block when a length of a packet is selected to be 140 bytes.

FIG. 14 schematically shows a structure of a block in the case that a length of a packet 71 is selected to be 140 bytes. At this time, two packets 71 are recorded on 3 blocks.

The time stamp 25 corresponds to information about a time duration during which a packet is transmitted. In other words, either a time duration during which a packet (head thereof) is transmitted or a time interval between packets is counted by a reference clock. This count value is recorded together with packet data. During the reproducing operation, the time interval between the packet is set based on this information, so that the data can be outputted in the same form when this data is transmitted.

Figure 15:
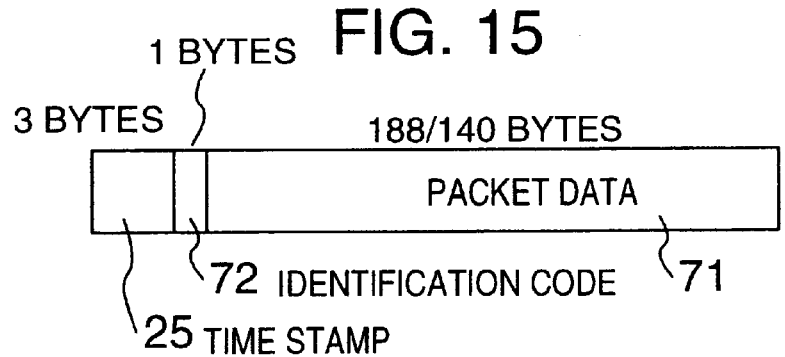
FIG. 15 schematically indicates another structural example of a packet.

FIG. 15 schematically shows another structural example of the packet shown in FIG. 13 or FIG. 14. This packet is constituted by, for example, 3-byte time stamp 25, an identification code 72 related to a 1-byte packet, and 188-byte, or 140-byte packet data 71. It should be understood that when the byte number of this packet data 71 is smaller than the above example, for instance, 130 bytes, dummy data may be added to this packet to be recorded, or the region of the identification code may be increased.

The time stamp 25 corresponds to information about a time duration during which a packet is transmitted. In other words, either a time duration during which a packet (head thereof) is transmitted or a time interval between packets is counted by a reference clock. This count value is recorded together with packet data. During the reproducing operation, the time interval between the packet is set based on this information, os that the data can be outputted in the same form when this data is transmitted.

As previously described, if a ratio of the byte number of 1 packet to the byte number of the recording area of 1 block may be expressed by a simple integer ratio of "n:m", and m pieces of packets are recorded on "n" pieces of blocks, then the packet data may be effectively recorded even when the packet length is different from the recording area of 1 block.

Figure 16:
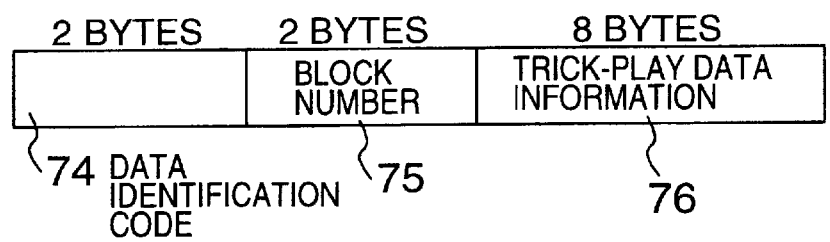
FIG. 16 schematically represents a structural diagram of block information.

FIG. 16 schematically shows a structure of the block information 32 shown in FIG. 12. The block information 32 corresponds to information used to discriminate data in unit of a block. A data identification code 74 corresponds to information used to discriminate a sort of data recorded on this block. For example, in a block on which the normal packet data is recorded, 0 is set; in a block on which the effective data is not recorded, 1 is set; in a block on which the first trick-play reproducing data is recorded, 2 is set; and a block on which the second trick-play reproducing data is recorded. A block number 75 corresponds to information used to discriminate a sequence of blocks when the packet data are recorded in the unit of 2 blocks, or 3 blocks. For example, when the packet data are recorded in the unit of 2 blocks, 0 to 1 are set. When the packet data are recorded in the unit of 3 blocks, 0 to 2 are set. Trick-play data information 76 corresponds to information used to discriminate a data sequence of the trick-play reproducing data.

Figure 17:
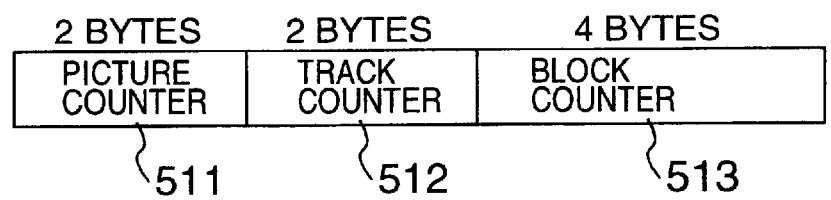
FIG. 17 schematically shows a structural diagram of trick-play data information.

FIG. 17 schematically represents a structure of the trick-play data information 76 shown in FIG. 16. In this drawing, reference numeral 511 indicates a picture counter for discriminating a picture, reference numeral 512 shows a track counter for discriminating a track, and reference numeral 513 denotes a block counter for discriminating a block in a track.

Figure 18:
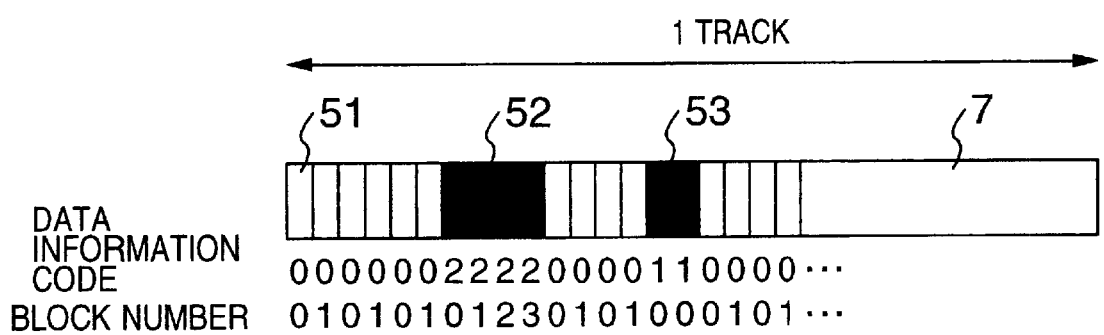
FIG. 18 schematically indicates a record example of data information and a block number.

FIG. 18 is an illustration of such an example when both the data identification code 74 and the block number 75 are recorded in the unit of 2 blocks. In this drawing, reference numeral 51 shows a block on which the normal packet data is recorded, reference numeral 52 indicates a block on which the trick-play reproducing data is recorded, and reference numeral 53 shows an unused area. In the trick-play reproducing data recording area 52, the block number is set to 0 to 3. It should also be noted that although the trick-play reproducing data recording area 52 is constructed of 4 blocks, the trick-play reproducing data recording area 52 is normally constructed of blocks larger than 4 blocks.

During the reproducing operation, the data identification code 74 is discriminated in the unit of a block, and the data identification code may be outputted by skipping such a block other than 0. As a result, even when the trick-play reproducing data, or the invalid data is recorded on any areas, the compatibility during the reproducing operation can be maintained. Also, when any specific data other than these trick-play reproducing data and invalid data is recorded, there is no problem if a different data identification code is allocated to this block.

Figure 19:
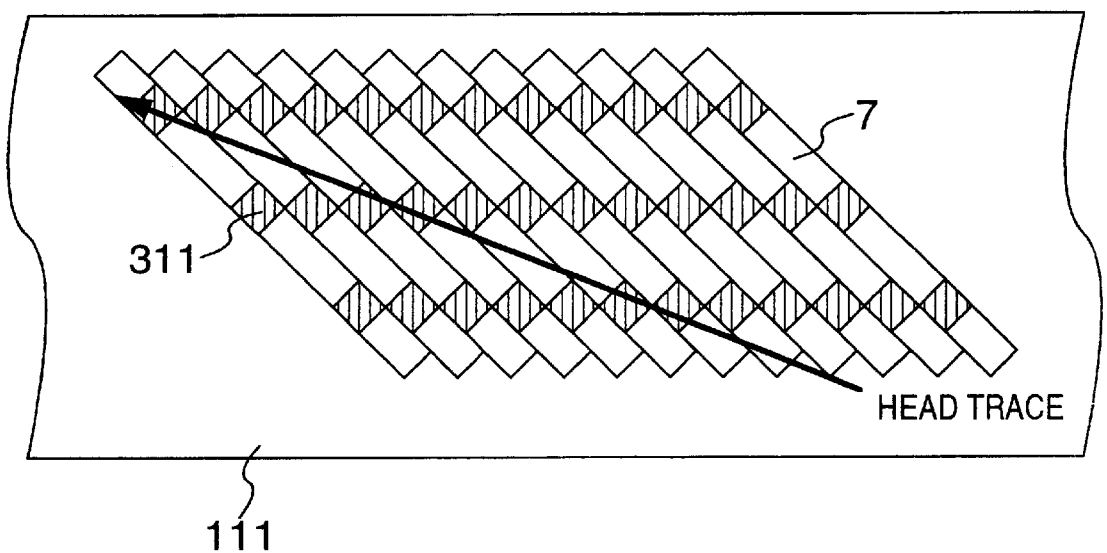
FIG. 19 is a schematic diagram for showing an arrangement of first trick-play data.

FIG. 19 illustratively shows an arrangement example of the first trick-play reproducing data. In this drawing, reference numeral 311 is the first trick-play reproducing data. The first trick-play reproducing data is recorded in such a manner that the same data are recorded on several tracks at a predetermined place of the tracks in a multiplex manner. As a result, even when the rotary head is scanned over any traces, all of the data recorded thereon can be detected. Since the trick-play reproducing data information 76 are identical to each other, the sequence of the data to be multiplexed can be discriminated during the reproducing operation. The multiplexing time may be set in correspondence with the speeds of the trick-play reproducing operation. It should also be noted that although the trick-play reproducing data are arranged on all of the continued tracks in FIG. 18, these trick-play reproducing data may not be arranged on all of the tracks. For instance, these trick-play reproducing data may be arranged on every 2 tracks. Although, in the above example, the same trick-play reproducing data are recorded on the several tracks in the multiplex manner at preselected positions on the tracks, these trick-play reproducing data may be arranged on the positions corresponding to the scanning traces of the rotary head.

Figure 20:
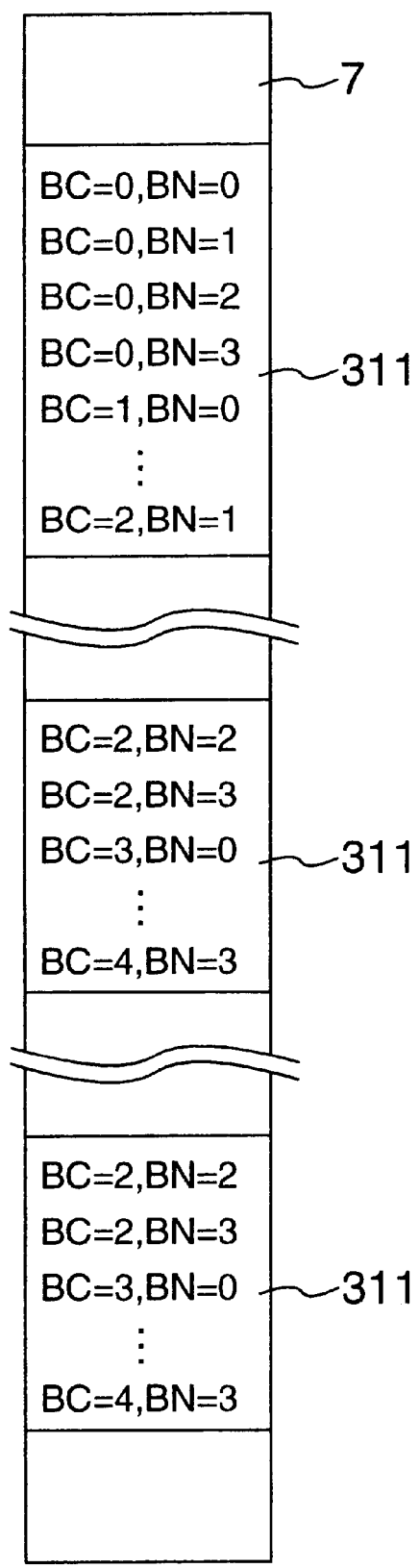
FIG. 20 is a schematic diagram for indicating an arrangement of trick-play data of 1 track.

FIG. 20 schematically shows an arrangement example of trick-play reproducing data of 1 track. An upper portion of FIG. 20 corresponds to a head of a track, namely, a lower side of the track shown in FIG. 19. In FIG. 20, a single area of the trick-play reproducing data is made of 10 blocks, and 3 areas are arranged on 1 track. In other words, 30 blocks (15 packets) of the trick-play reproducing data can be recorded on a single track. Alternatively, the block numbers of a single area, and the area numbers of a single track may be selected to be other values than the above-described quantities. For instance, 6 areas may be arranged in a single track. Also, the block numbers in the respective area may be made different from each other. Symbol "BC" represents a value of the block counter 513, which is added to the respective blocks. Based on the block number 75 and the block counter 513, it is possible to discriminate that one trick-play reproducing data corresponds to that of which block within 1 track.

Figure 21:
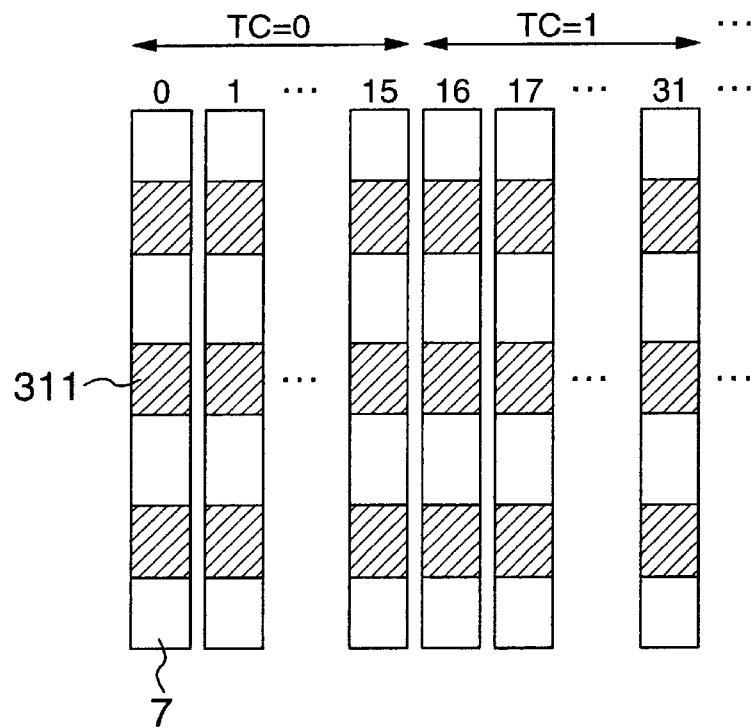
FIG. 21 is a schematic diagram for representing an arrangement of a track counter.

FIG. 21 schematically shows an arrangement example of the track counter 512. In this drawing, reference numeral 7 shows 1 track indicated in FIG. 20, and symbol "TC" denotes this track counter 512. The trick-play reproducing data is arranged in such a manner that the same data are arranged in the plural tracks, for example, 16 tracks. Then, the same track counter values are allocated to the tracks on which the same data are arranged, so that the trick-play reproducing data can be discriminated in the unit of a track. For example, when the track counter is equal to 2 bytes, 4×16=64 tracks can be discriminated. Since the head trace does not exceeds 16 tracks during the normal trick-play reproducing operation, more than 64 tracks can be discriminated, taking account of the scanning sequence of the rotary head.

Figure 22:
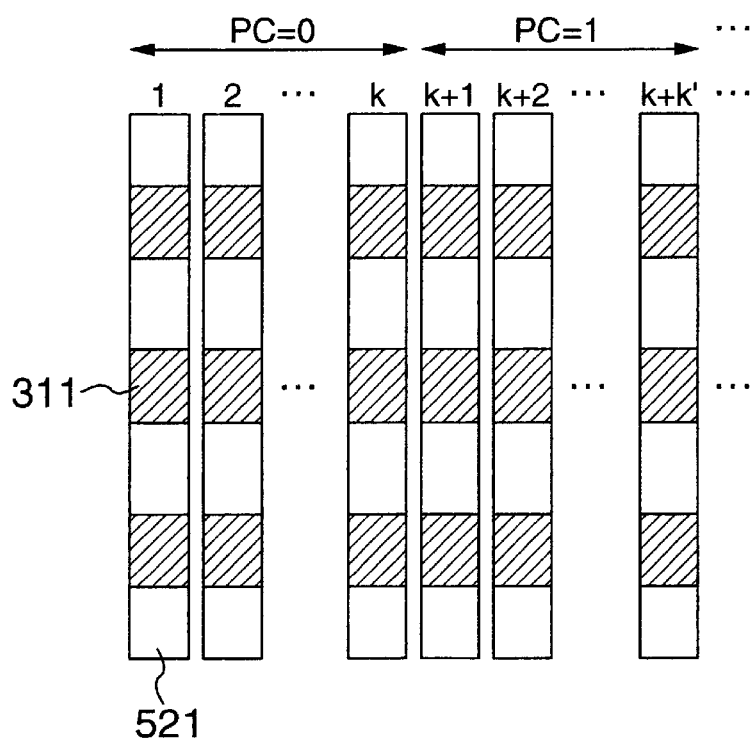
FIG. 22 is a schematic diagram for representing an arrangement of a picture counter.

FIG. 22 schematically indicated an arrangement example of the picture counter 511. In this drawing, reference numeral 521 shows such tracks whose track counter values are the same, for example, 16 tracks, and symbol "PC" indicates this picture counter 511. FIG. 22 is such a case that first k×16 tracks and next k'×16 tracks constitute one picture. For example, one picture is arranged by 100 packets. When 15 packets can be recorded on one track, it may be defined by: (100/15)+1>k>100/15. In other words, a single picture may be arranged on 7×16 tracks. Apparently, if k>100/15, then more tracks may be allocated.

When data of one picture is completed in unit of a track, a data producing process operation and a data reproducing operation may be readily performed. Also, in the case that the remaining track portion when the data of one picture is ended in a half way of the relevant track may be used as a block of dummy data, for instance, the data identification code 74 may be set to "1". Also, invalid data may be arranged as the trick-play reproducing data. Apparently, the data of one picture may not be completed. In this case, the value of the picture counter 511 is changed in a half way of the relevant track.

Since the picture counter 511 is added in such a manner that a cut-out portion of a picture can be discriminated, even when the data are not sequentially reproduced as during the trick-play reproducing operation along the reverse direction, the data of one picture can be readily discriminated. In other words, the data of one picture is discriminated by the picture counter 511, and the sequence of the data contained in one picture is discriminated based upon the track counter 512, the block counter 513, and the block number 75, so that the data of one picture can be outputted in the correct sequence.

Figure 23:
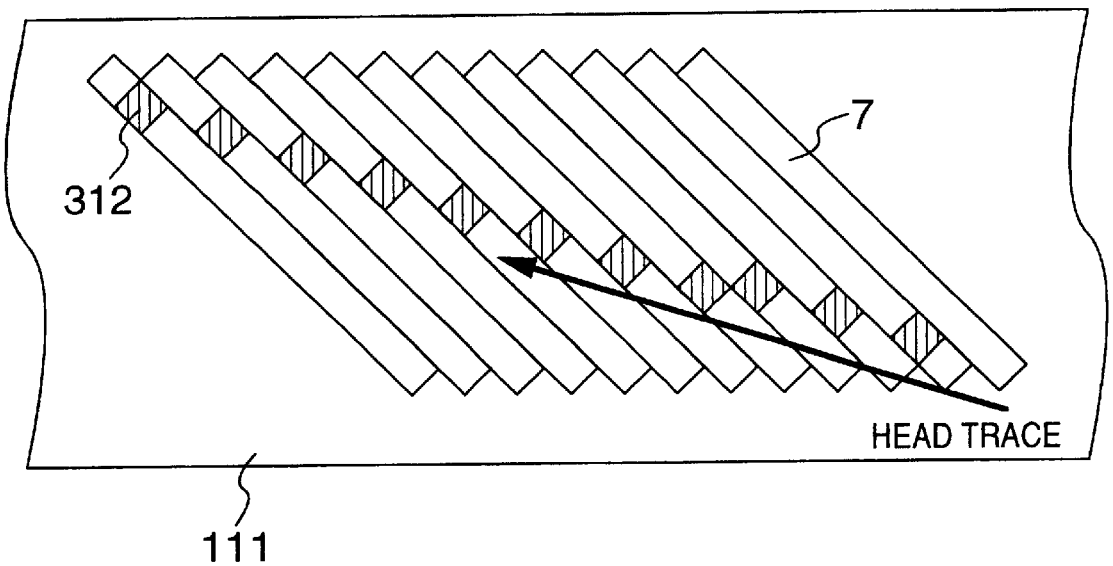
FIG. 23 is a schematic diagram for showing an arrangement of second trick play data.

FIG. 23 schematically represents an arrangement example of the second trick-play reproducing data. In this drawing, reference numeral 312 indicates this second trick-play reproducing data. Since the second trick-play reproducing data is arranged in correspondence with the scanning trace of the rotary head in this manner, the areas used to record the trick-play reproducing data are decreased, but the scanning control of the rotary head becomes difficult.

Figure 24:
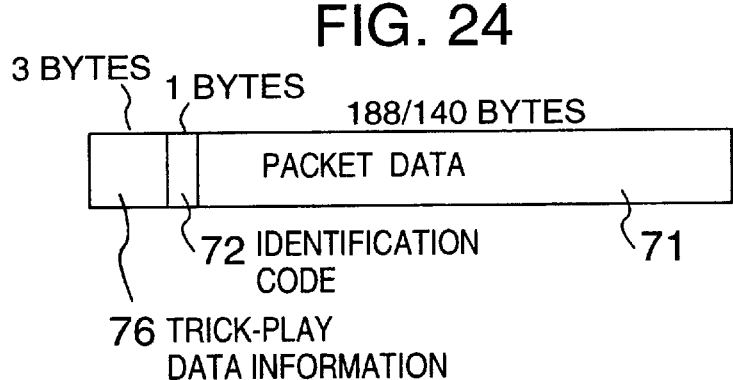
FIG. 24 schematically indicates another structural example of a packet of trick play data.

It should also be noted that, as indicated in FIG. 17, the trick-play data information 76 may be added in unit of 2 blocks, or 3 blocks discriminatable by a block number 75. Also, since no time stamp is required in the trick-play reproducing data, as indicated in FIG. 24, the trick-play data information 76 may be arranged instead of the time stamp 25. Apparently, two places may be commonly used.

Figure 25:
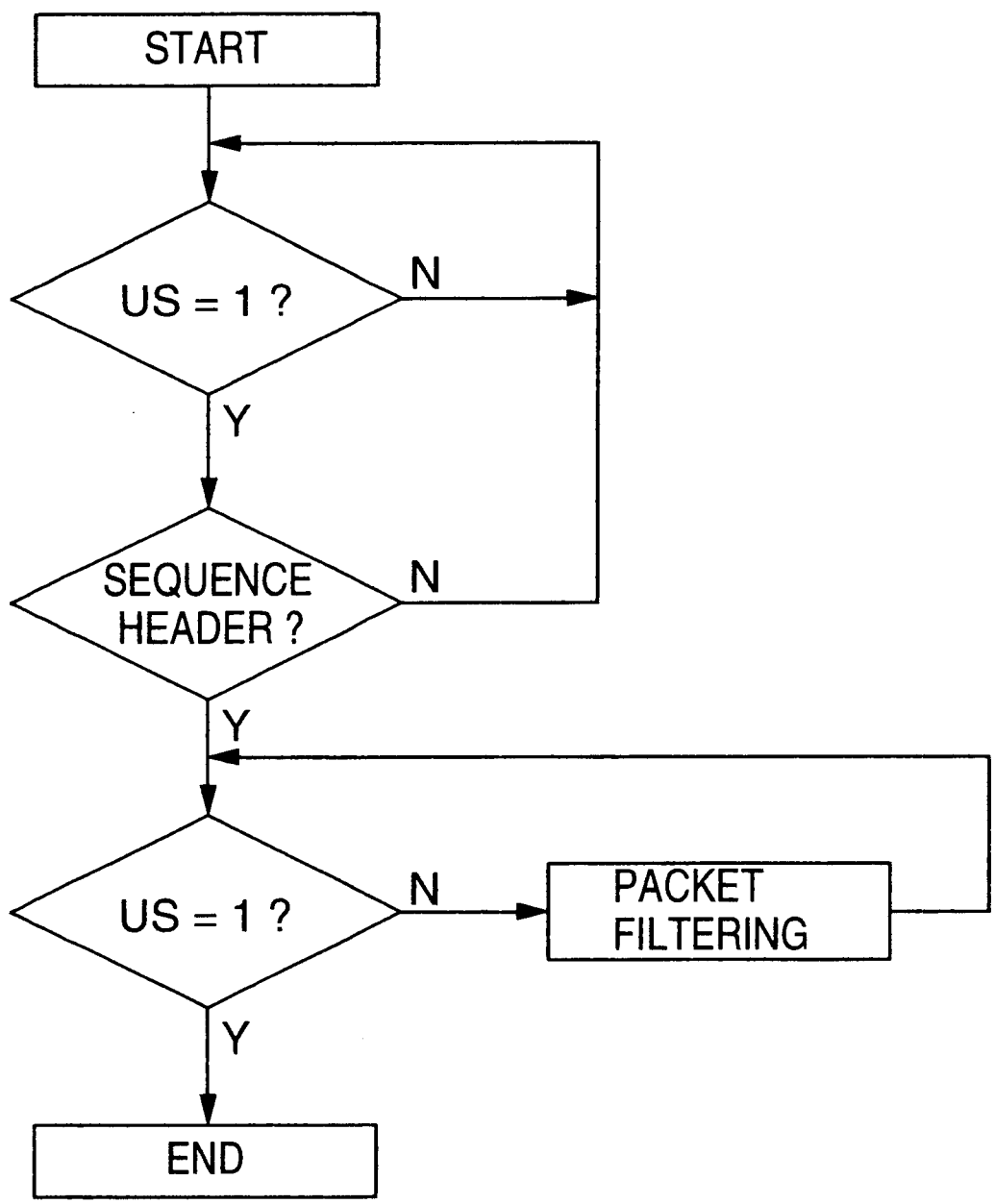
FIG. 25 is a flow chart for describing a production of trick play data from video signal packet data.

FIG. 25 is a flow chart for describing an operation to produce the trick-play reproducing data from the video signal packet data shown in FIG. 5C. Since the trick-play reproducing data must be independently decoded, this trick-play reproducing data must be intraframe data. As a result, since the intraframe data is extracted in unit of a packet, the trick-play reproducing data can be easily produced.

In this flow chart, a confirmation is first made of a unit starting indication of an inputted packet so as to detect a head of a picture. Alternatively, the head of the picture may be detected based upon a picture header and so an. Next, another confirmation is made as to whether or not a sequence header is present in a packet of the head of the picture. Accordingly, a head of a sequence, namely an intraframe picture is detected. Apparently, the intraframe picture may be alternatively detected based on any information other than the sequence header. Then, data packets from this packet up to a head packet of a second picture are filtered as trick-play reproducing data, namely data of one intraframe picture is filtered as this trick-play reproducing data.

Alternatively, the trick-play reproducing data may be reconstructed from the extracted intraframe picture. For example, when trick-play reproducing data is reconstructed so as to lower resolution of a picture, a data amount of this trick-play reproducing data may be reduced.

Figure 26:
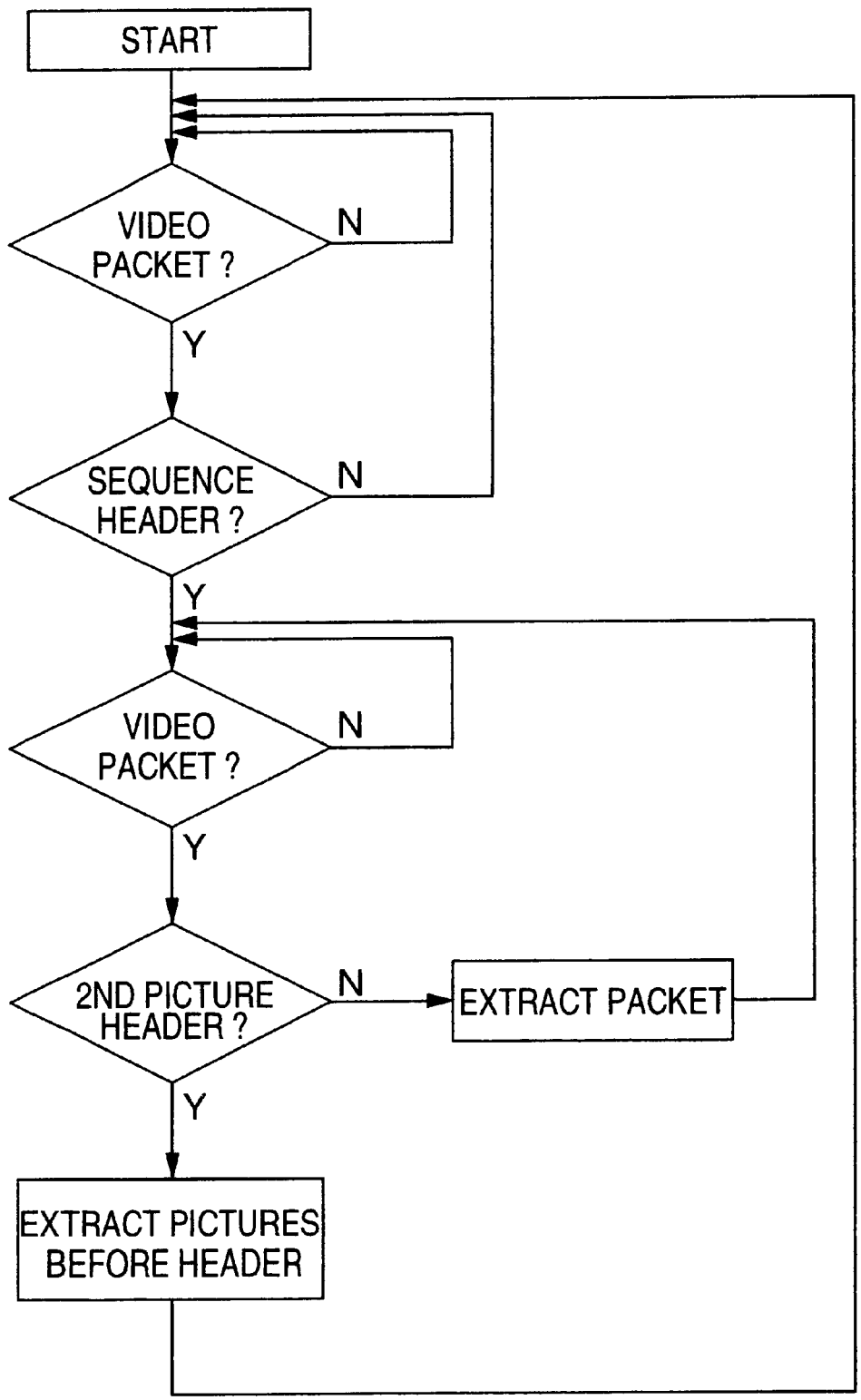
FIG. 26 is a flow chart for describing a production of trick play data.

FIG. 26 is a flow chart for describing an operation to produce trick-play reproducing data from the recording packet data of FIG. 6(b). Since the trick-play reproducing data must be independently decoded, this trick-play reproducing data must be intraframe data. As a result, since the intraframe data is extracted in unit of a packet, the trick-play reproducing data can be easily produced.

First, in this flow chart, a confirmation is made of a packet header of an inputted packet to thereby select only a packet of a video signal. Then, packet information of the selected packet is confirmed so as to detect such a packet having a sequence header. Then, data packets from this packet to a packet having a second picture header are filtered as the trick-play reproducing data. As to a packet having a final second picture header, the data subsequent to the second picture header is replaced by dummy data, so that erroneous operation occurred during the decoding operation can be prevented. To simplify the process operation, the data packets prior to the packet having the last second picture head may be filtered.

Normally, since a intraframe is located behind a sequence header, a head of trick-play reproducing data is used as the sequence header, the process operation can be readily carried out. Also, there are many cases that a decoding operation is carried out while using a sequence header as a basis in a normal decoding circuit. As a result, since the data contains the sequence header, the easy decoding operation can be done. When the decoding circuit executes the decoding operations by using the picture head as the reference, the head of the trick-play reproducing head may be employed as the picture header. In this case, the information of the picture header is detected, so that the intraframe may be selected.

Figure 27:
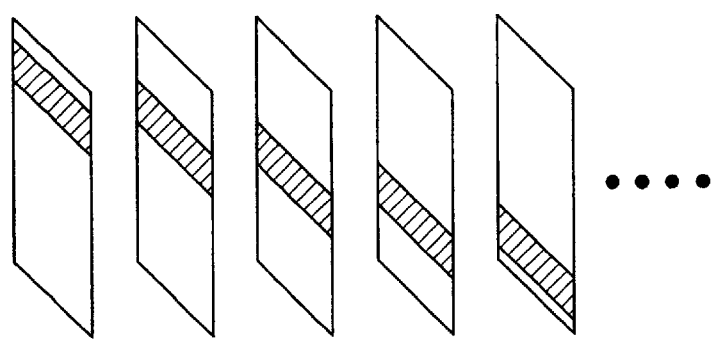
FIG. 27 illustratively shows a producing example of trick play data.

As previously described, the trick-play reproducing data can be produced in the above-described manner. In such a case that the data amount of the intraframe is large, and is greater than the recording capacity of the area for recording the trick-play reproducing data, the data may be deleted in unit of the frame, or a portion of the data contained in the frame may be deleted. In the former case, the image represents coarse motion, but the image quality is not changed. For example, only data of 1 frame is filtered every 2 frames, or 3 frames (sequence) as the trick-play reproducing data. In the latter case, although noise appears in the reproduced image, the motion of the image can be maintained to some extent. In this case, a preselected amount of frames from the heads of the respective frames may be filtered out. However, instead of this filtering method, when the different image portions in the respective frames is deleted, the reproduced image quality may be improved, as shown in FIG. 27. In FIG. 27, hatched portions correspond to image portions to be deleted. Apparently, the above-described two methods may be combined to be executed.

Figure 28:
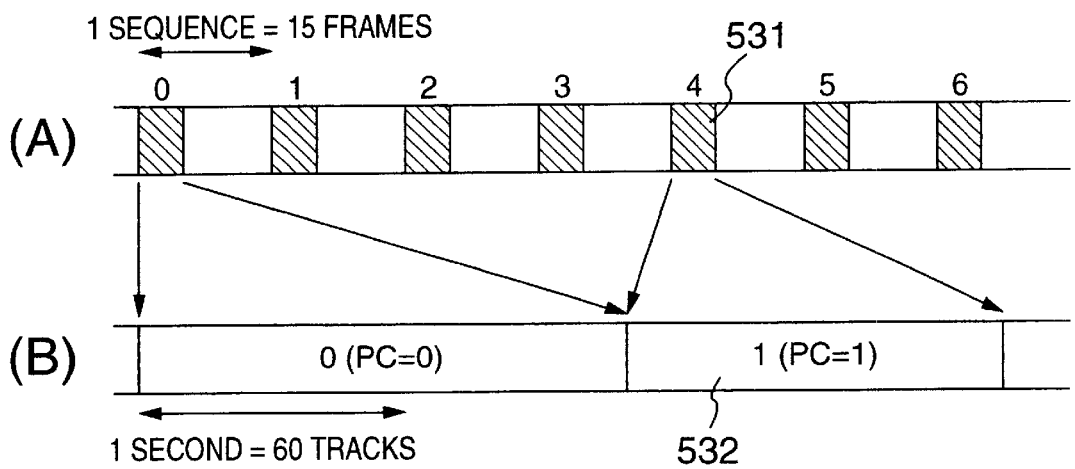
FIG. 28 is a timing chart for extracting data of an intraframe picture.

FIG. 28 illustratively indicates a timing chart for explaining data extract timing of an intraframe picture. FIG. 28(a) shows video signal data corresponding to FIG. 5C, and reference numeral 531 indicates data of the intraframe picture. The normal reproducing data is recorded at this timing. FIG. 28(b) shows trick-play reproducing data arranged on a tape, and reference numeral 532 shows data of the intraframe picture. In the case that 1 sequence is equal to 15 frames, it becomes 2 intraframe pictures per 1 second. On the other hand, assuming now that the rotation number of the rotary head is equal to 1,800 rpm, 60 tracks are recorded per 1 second. As a result, if 1 intraframe picture can be arranged on 30 tracks, then the recording picture can be satisfied. However, since the capacity of the trick-play reproducing data area is limited, more than 30 tracks are normally required to this end, the first picture (picture 0) is arranged on the track, and the next packet extraction may be commenced at the time when the picture arrangement is ended. Apparently, the packet extraction may be commenced not at the time when the picture arrangement is ended, but at the time before/after the picture arrangement is accomplished.

Figure 29:
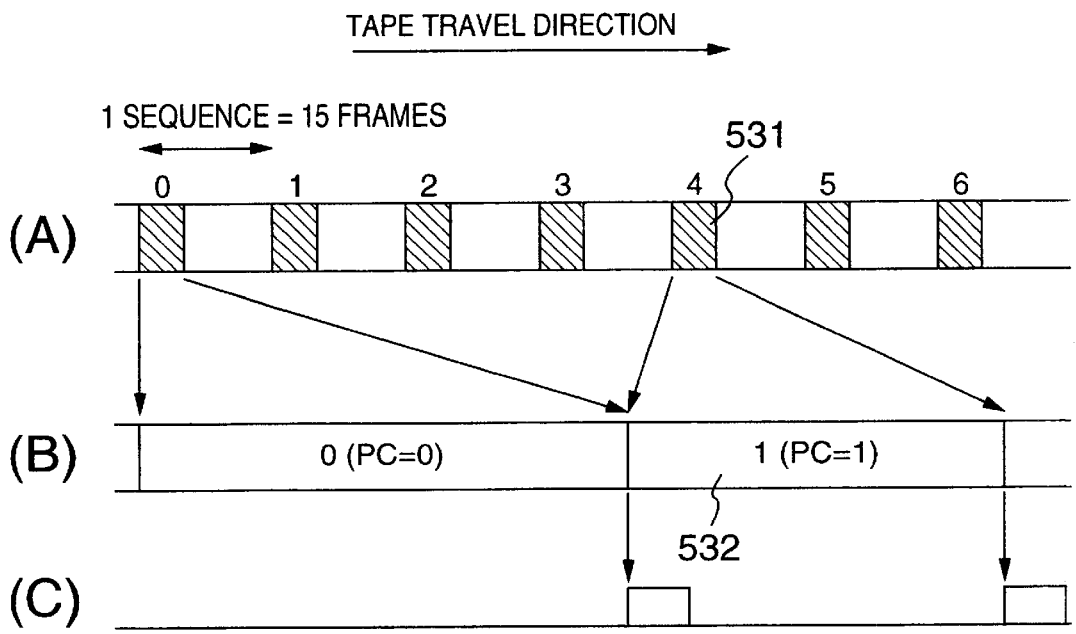
FIG. 29 is a timing chart for reproducing trick play data in a trick-play reproducing mode.
Figure 30:
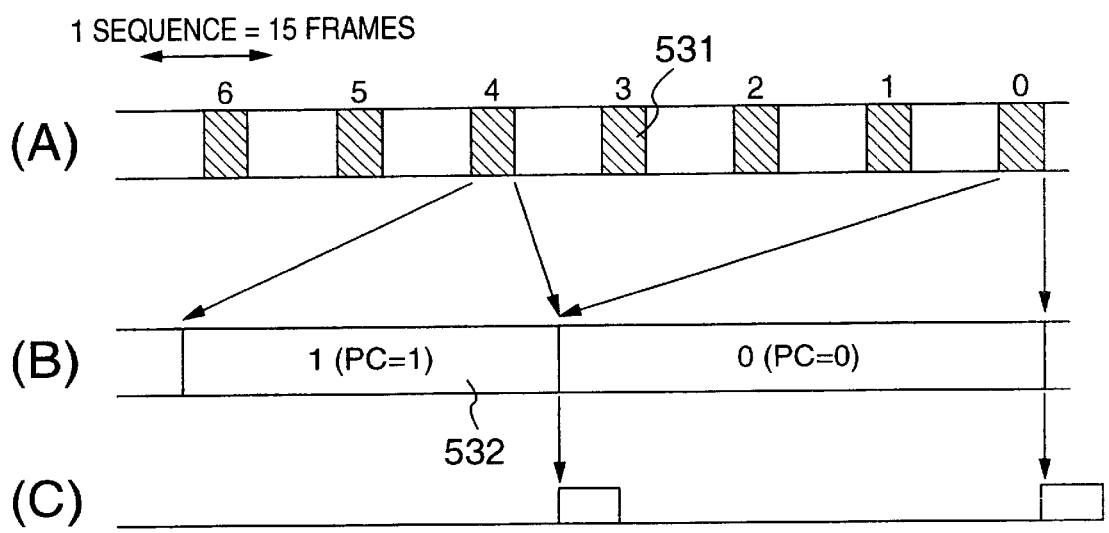
FIG. 30 is a timing chart for reproducing trick play data in a trick-play reproducing mode along a reverse direction.

FIG. 29 and FIG. 30 are timing charts in the case that the trick-play reproducing data recorded in FIG. 28 are reproduced in the trick-play reproducing mode. FIG. 29 shows a timing chart when the trick-play reproducing operation is performed along a normal direction. During this normal direction, the trick-play reproducing data is reproduced along the same order used during the recording operation. As a consequence, the reproduced trick-play reproducing data may be sequentially outputted. Otherwise, as indicated in FIG. 29(c), at a time instant when one picture data is reproduced, the reproduced trick-play reproducing data may be outputted in the unit of this picture. FIG. 30 indicates a timing chart when the trick-play reproducing operation is carried out along a reverse direction. During the reverse direction, the trick-play reproducing data are reproduced along a direction opposite to the direction during the recording operation. As a consequence, a cut-out portion of a picture is discriminated by the picture counter 511, and then the data contained in the picture are rearranged by the track counter 512 and the block counter 513 along the data arrangement order during the recording operation. Then, at a time instant when data of one picture is reproduced, as indicated in FIG. 30(c), these picture data may be outputted in unit of this picture.

Figure 31:
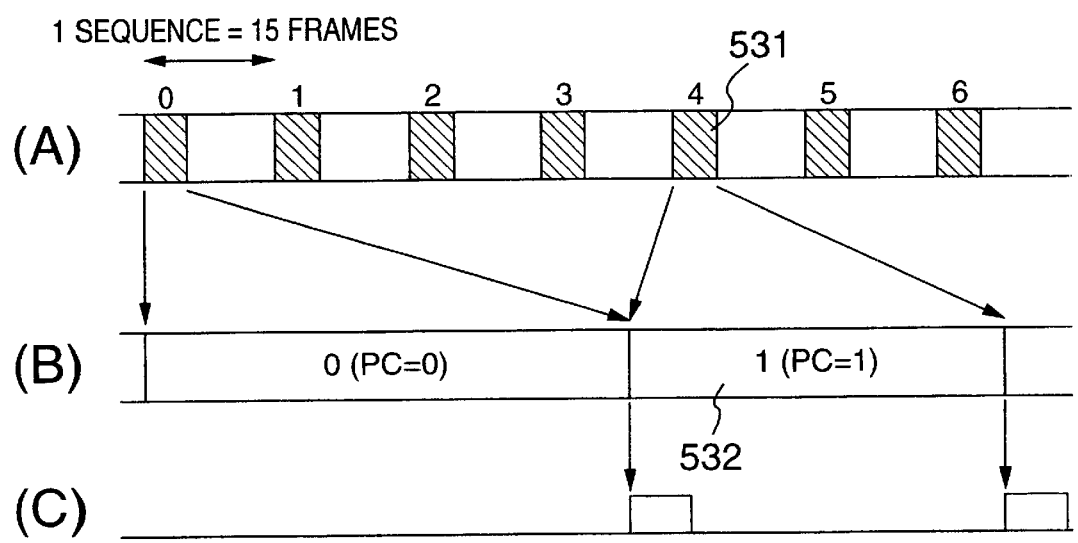
FIG. 31 is a timing chart for stopping the trick play reproducing operation.

FIG. 31 shows a timing chart when the trick-play reproducing operation is stopped. In this drawing, symbol "A" indicates such a position when the trick-play reproducing operation is stopped. At this position "A", the picture under reproduction corresponds to a picture recorded at another position "B". As a consequence, if the tape is returned to the position B after the trick-play reproducing operation is stopped, then the same picture when the trick-play reproducing operation is stopped can be reproduced during the reproducing operation. It should be understood that the amount of the tape to be returned must be determined by considering not only the position on the tape, but also the time shifts occurred when the signal is processed during the trick-play reproducing operation, and the picture is decoded. In such a case that the positional shifts on the tape differ from each other, depending upon the tape locations, the tape may be returned based on an average value of these positional shifts. Furthermore, if the total number of tracks on which one picture is recorded is counted, or the total number ofpackets are counted and then the tape return amount is determined based on the counted value, the tape can be returned in higher precision. FIG. 31 shows the timing when the trick-play reproducing operation is carried out along the normal direction, which similarly may be applied to the trick-play reproducing operation along the reverse direction. It should be understood that when the trick-play reproducing data is recorded as in FIG. 28, since there is substantially no positional shift on the tape when the trick-play reproducing operation is carried out along the reverse direction, the resultant tape return amount may be reduced. The tape may be returned at timing immediately after the trick-play reproducing operation is ended, or at timing when the trick-play reproducing operation is ended and thereafter is changed to the normal reproducing operation.

Also, during the trick-play reproducing operation for detecting a specific position such as a head of a program, a flag indicative of the head of this program, recorded on the tape, may be detected so as to stop the trick-play reproducing operation. In this alternative case, the tape returning operation after stopping the trick-play reproducing operation is not required.

Figure 32:
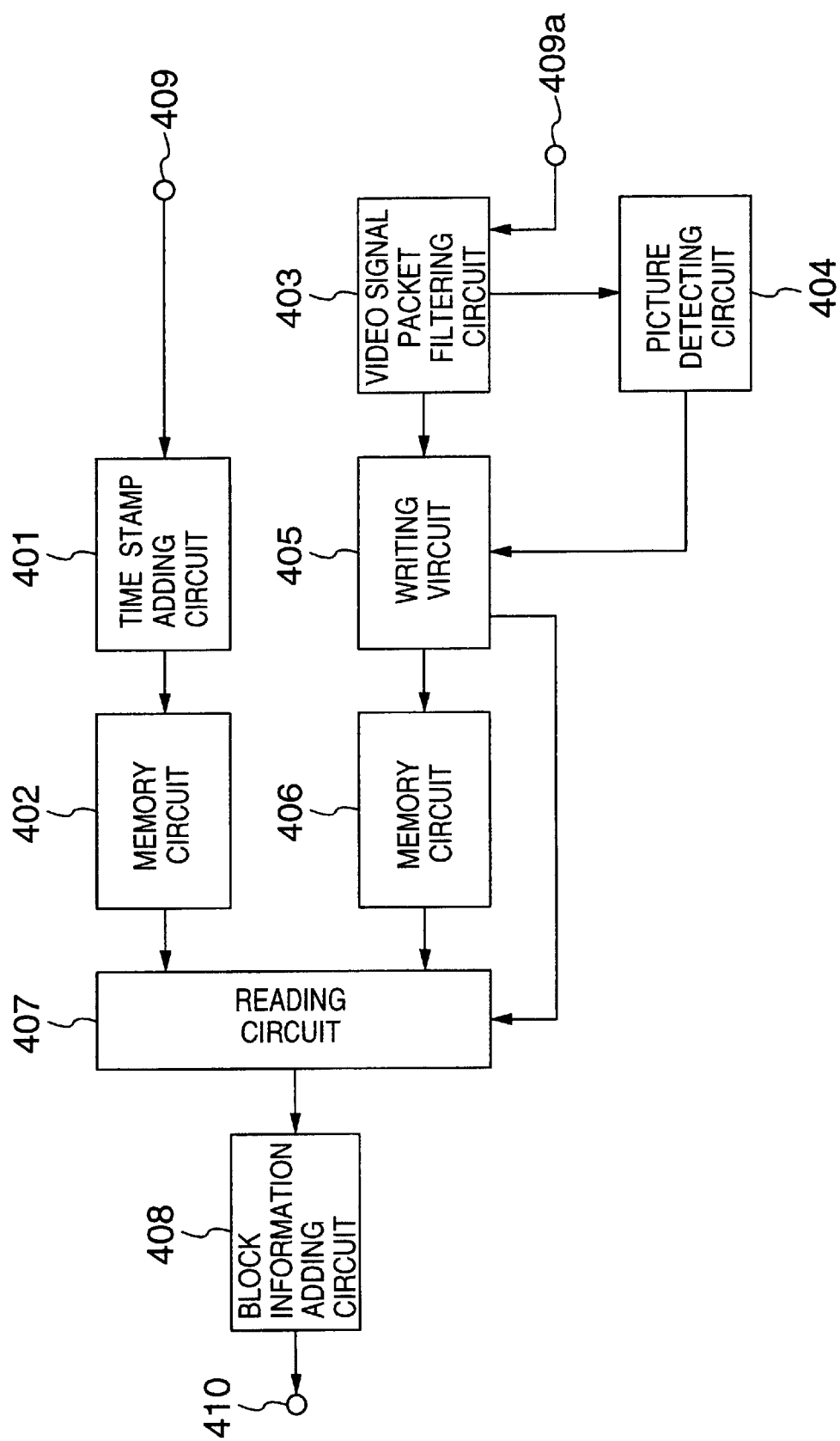
FIG. 32 is a schematic block diagram for showing a data producing circuit.

FIG. 32 is a schematic block diagram for indicating an arrangement of the data generating circuit 115 shown in FIG. 1. In this drawing, reference numeral 401 is a time stamp adding circuit, reference numeral 402 shows a memory circuit, reference numeral 403 indicates a video signal packet filtering circuit, reference numeral 404 denotes a picture detecting circuit, reference numeral 405 is a writing circuit, reference numeral 406 shows a memory circuit, reference numeral 407 indicates a reading circuit, and reference numeral 408 shows a block information adding circuit. A packet outputted from the input/output circuit 107 is entered via an input terminal 409 to the time stamp adding circuit 401, and thus the time stamp 25 is added to this packet. It should be understood that when a packet to which the time stamp 25 has been added is entered to this data generating circuit 115, this process operation need not be carried out. The packet to which the time stamp is added is stored in the memory circuit 402. At the same time, in the video signal packet filtering circuit 403, the picture packet is filtered out based on the packet ID 505 of the entered packet, and then is outputted to the writing circuit 405 and the picture detecting circuit 404. It should also be noted that although the time stamp is added only to such a packet which is stored in the memory circuit 402 and used during the normal reproducing operation, a similar time stamp may be added to the trick-play reproducing data.

In the picture detecting circuit 404, the header information is detected which is contained in the packet information 307, and the trick-play reproducing data is stored in the memory circuit 406 by controlling the writing circuit 405 in accordance with the flow chart of FIG. 22 and the timing chart of FIG. 23. At the same time, a range where one picture is stored is memorized. In the reading circuit 407, the packet data stored in the memory circuit 402 and also the memory circuit 406 are sequentially read out to obtain the recording data with the arrangement of FIG. 18. Then, the block information 32 is added to this recording data by the block information adding circuit 408, and the resultant data is outputted to the recording/ reproducing signal processing circuit 102. As to trick-play reproducing data, the block counter 513, the counter 512, and the track counter 512 are generated based on the position of the block on which the data is arranged and also the track number to be added, and also the picture counter 511 is generated based upon the range of one picture stored in the memory circuit 406 to be added. Then, the recording signal of FIG. 8 is produced to be recorded in the recording/reproducing signal processing circuit 102.

Figure 33:
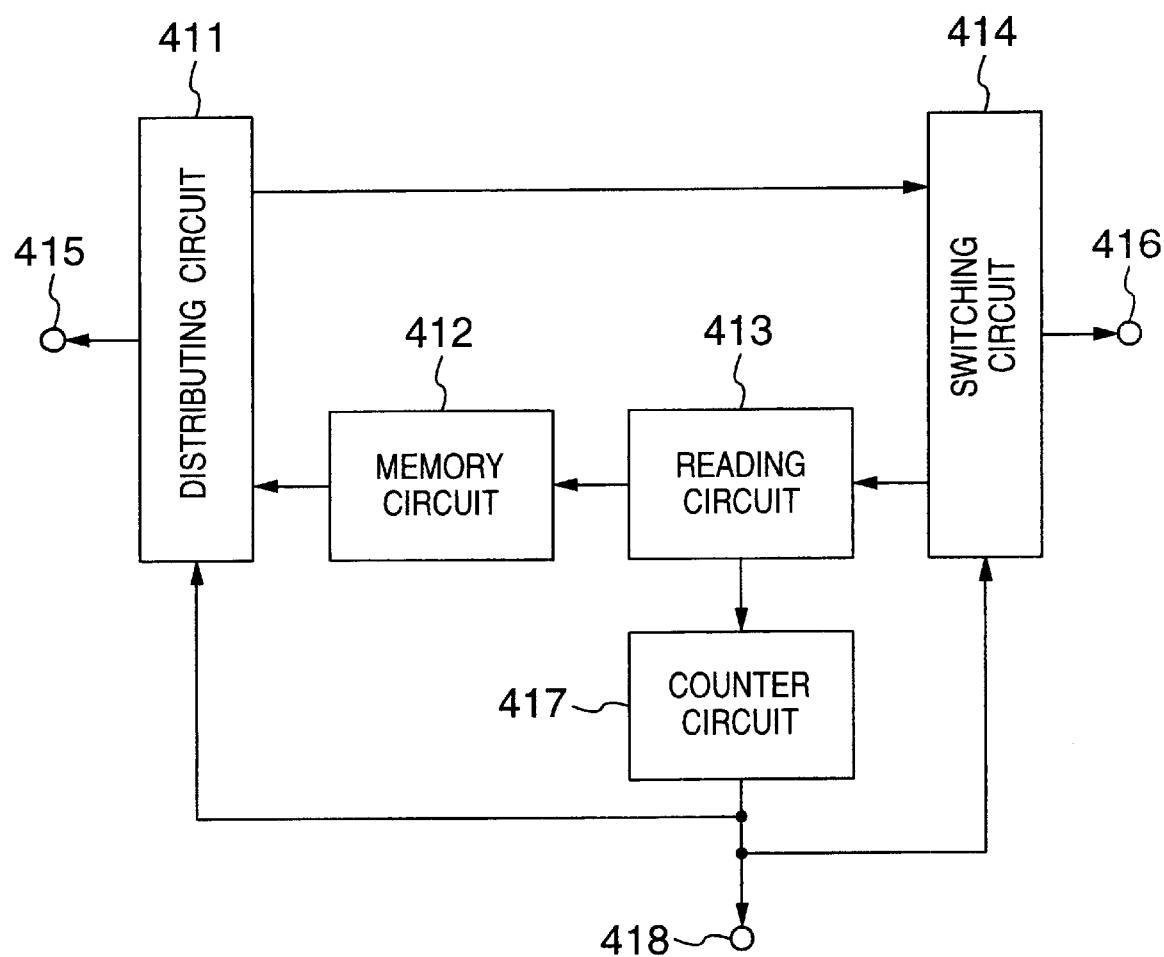
FIG. 33 is a schematic block diagram for representing a data selecting circuit.

FIG. 33 is a schematic block diagram for indicating the data selecting circuit 116 of FIG. 1. In this drawing, reference numeral 411 indicates a packet data distributing circuit, reference numeral 412 represents a memory circuit, reference numeral 413 denotes a reading circuit, reference numeral 414 shows a switching circuit, and reference numeral 417 denotes a counting circuit.

During the normal reproducing operation, the content of the packet is detected based on the block information of the reproduction packet data inputted from the input terminal 415 in the distributing circuit 411. Then, the normal reproducing packet is selected and outputted via the switching circuit 414 from the output terminal 416 to the input/output circuit 107.

During the normal reproducing operation, the packet of the trick-play reproducing data is selected in the distributing circuit 411 to thereby be outputted to the memory circuit 412. This packet is written to positions corresponding to the data sequence of the trick-play reproducing data information 76 into the memory circuit 412. Then, the packet data are sequentially read by the reading circuit 413 to be outputted via the switching circuit 414 from the output terminal 416 to the input/output circuit 107. At the same time, in the counting circuit 417, a quantity of packets, or tracks for constituting one picture is counted. The counted value is outputted via the output terminal 418 to the control circuit 104. In the control circuit 104, the tape return amount after the trick-play reproducing operation is determined by this count value, and then the servo control circuit 106 is controlled based on this tape return amount. During the trick-play reproducing operation, especially during the trick-play reproducing operation along the reverse direction, the trick-play reproducing data are not reproduced in accordance with the sequential order. As a consequence, as represented in the timing chart of FIG. 25, if the data reading operation is commenced after the data has been firstly written and a preselected time period has passed, it is possible to avoid that the data is not read before being written.

Figure 34:
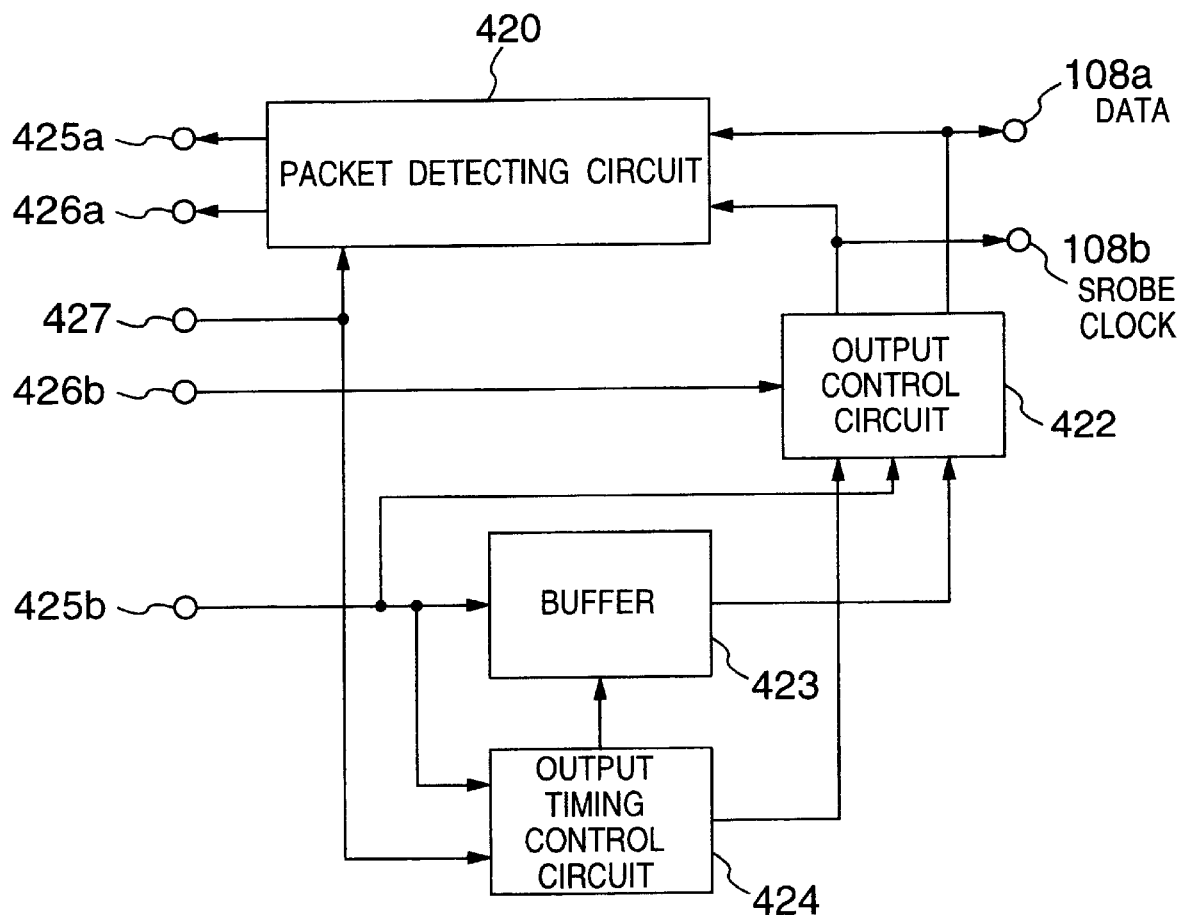
FIG. 34 is a schematic block diagram for indicating an input/output circuit.

FIG. 34 is a schematic block diagram for showing an arrangement of the input/output circuit 107 shown in FIG. 1. In this drawing, reference numeral 420 is a packet detecting circuit, reference numeral 423 shows a buffer, and reference numeral 424 represents an output timing control circuit.

Figure 35:
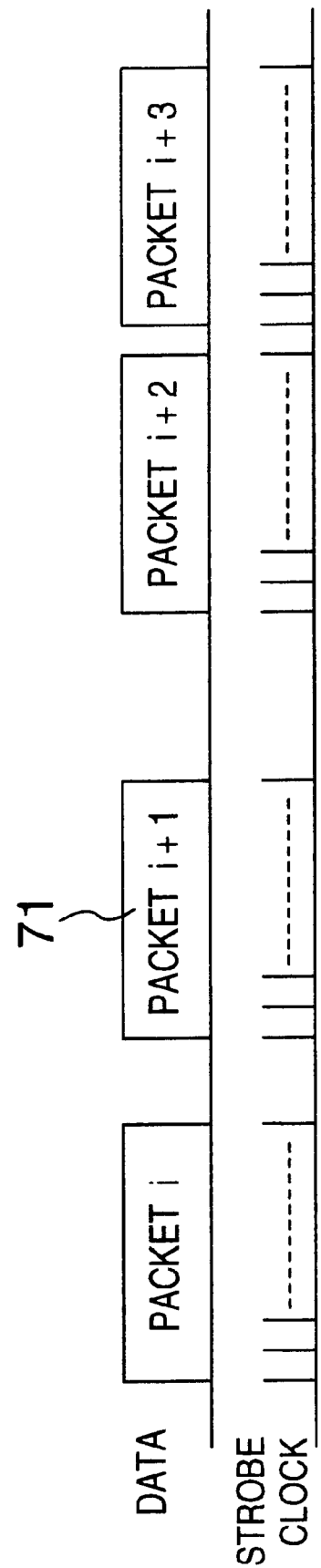
FIG. 35 shows an input/output timing chart.

During the recording operation, both data and a strobe clock are entered from an input/output terminal 108a and another input/output terminal 108b at timing as indicated in FIG. 35. Both the entered data and strobe clock are inputted to the packet detecting circuit 420, and a packet is detected in response to the clock produced from the timing signal generating circuit 105 (FIG. 1), which is entered from an input terminal 427. Then, the detected packet 71 is supplied via an output terminal 425a to the data generating circuit 115 (FIG. 1). The control signal and the like, which are added to the packet to be transmitted are outputted from an output terminal 426a to the control circuit 104 (FIG. 1), so that the sort of this packet is discriminated, and the recording mode is determined.

During the normal operation, in response to the control signal derived from the control circuit 104 (FIG. 4) and entered from the input terminal 426b, the output control circuit 422 is controlled to an output mode, and the reproduced packet 71 is outputted in synchronism with the reference clock oscillated from the oscillator 110. A packet entered from the input terminal 425b is stored in the buffer 423. The time stamp 25 contained in the packet is inputted to the output timing control circuit 424. In response to the clock entered from the input terminal 427 and the time stamp 25, the output timing control circuit 424 controls the timing at which the packet is read from the buffer 423, and also generates the stroke clock. Then, the output timing control circuit 424 outputs the strobe clock at the same timing as the timing shown in FIG. 33, namely, the timing at which the recording data is inputted. As a result, in a decoding apparatus of a digital compression video signal, or in an apparatus for receiving a packet reproduced by another digital signal recording/reproducing apparatus to process this packet, a signal after being recorded/reproduced can be processed by the same process operation executed in such a case that a signal before being recorded is directly processed.

During trick-play reproducing operation, the trick-play reproducing data is changed from the original data stream, and therefore there is no meaning to control the time stamp. As a result, as indicated in the timing of FIG. 29 or FIG. 16, the trick-play reproducing data are outputted in unit of the picture at constant timing. It should also be noted that if the output timing is acceptable in the digital broadcasting receiver 201, then any timing may be employed.

It should also be noted that although the data input and output operations are carried out by employing the common terminal in the above-described embodiment, an input terminal and an output terminal may be separately employed.

FIG. 36 is a schematic block diagram for showing an arrangement of the demultiplex circuit 204 shown in FIG. 2. In this drawing, reference numeral 601 is a descrambling circuit, reference numeral 602 shows a switching circuit, reference numeral 603 is a decode-demultiplex circuit, reference numeral 604 represents a record-demultiplex circuit, and reference numeral 609 denotes a clock recovering circuit.

During the receiving operation, the descrambling circuit 601 descrambles the scrambled reception signal entered via an input terminal 605, and supplies the descrambled reception signal via the switching circuit 602 to the decode-demultiplex circuit 603. The decode-demultiplex circuit 602 selects a video packet and an audio packet of a channel under reception based upon a packet ID, and outputs a video signal and an audio signal contained in the packets via output terminals 606a and 606b to the decoding circuit 205. At the same time, the clock recovering circuit 609 produces an operation reference clock having a frequency of, for instance, 27 MHz for the decoding circuit 205 based on the time stamp contained in the received packet, which is synchronized with the reception signal, and then outputs this operation reference clock via an output terminal 606c. Also, the record-demultiplex circuit 604 selects a required packet of a channel to be recorded, and then outputs the selected packet via the input/output terminal 607 to the interface circuit 206. At this time, the packet information is corrected, and added, if required.

When the recorded signal is reproduced, the reproduction signal entered from the input/output terminal 607 is supplied via the switching circuit 602 to the decode-demultiplexing circuit 603. During the normal reproducing operation, both the video packet and the audio packet are inputted at the same timing when the receiving operation is carried out. As a consequence, a similar process operation to that of the receiving operation is carried out also in the decode-demultiplex circuit 603, and thus the video signal, the audio signal, and the operation reference clock may be outputted via the output terminals 606a, 606b, 606c to the decoding circuit 205. On the other hand, during the trick-play reproducing operation, only the video packet is to be reproduced, and the reproducing timing is different from the recording timing. As a consequence, in the decode-demultiplex circuit 603, only the video packet may be demultiplexed, whereas the multiplexing operation of the audio packet may be stopped, and also the generation of the operation reference clock in synchronism with the time stamp in the clock recovering circuit may be stopped. As the operation reference clock, for example, a clock internally oscillated may be outputted via the output terminal 606c. At this time, since only the video packet is entered to the decode-demultiplex circuit 603, all of the packets are recognized as the video packets irrespective of sorts of the packets. Then, if all of the packet signals are outputted from the output terminal 606a, even when the packet ID is changed such as even when the channel under record is changed, the video signal can be continuously outputted without redetecting the packet ID.

In the decoding circuit 205, while using the operation reference clock outputted from the demultiplex circuit 204 as the reference, both the video signal and the audio signal are decoded during the signal receiving operation and also the normal reproducing operation, whereas only the video signal is decoded during the trick-play reproducing operation.

In accordance with the present invention, in the recording apparatus for recording the digital compression video signal with the packet format, the trick-play reproducing data is extracted in unit of the packet, so that the trick-play reproduction data can be readily produced without reconstructing the packet.

Also, according to the present invention, such information used to discriminate the sequence of the data and the cut-out portion of the picture is added to the trick-play reproducing data, and then the resultant trick-play reproducing data is recorded, so that the sequence of the reproduced trick-play reproducing data and the cut-out portion of the picture can be readily discriminated along the trick-play reproducing operation.

Furthermore, in accordance with the present invention, during the normal reproducing operation, the reproduced signals are outputted by controlling the output timing of the packet equal to the input timing during the recording operation based on the time stamp added to the packet to be recorded. During the trick-play reproducing operation, the output timing is switched so as to output the reproduced signals at the constant timing irrespective of the input timing during the recording operation. Furthermore, the demultiplex process operations by the packet demultiplex circuit for decoding the data packet are switched. As a result, the reproducing operated of the recording/reproducing apparatus can be commonly applied to the normal reproducing operation and the trick-play reproducing operation. Moreover, since a constant amount of the tape is returned when the trick-play reproducing operation is accomplished, when the reproducing operation is changed from the trick-play reproducing operation to the normal reproducing operation, the picture can be continued.

What is claimed is:

1. A digital video signal recording method for recording a first compression frame signal compressed without using a correlation between frames, and a digital compression video signal having preselected bytes of a packet format constituted by a second compression frame signal compressed with using the correlation between the frames, wherein:
   a third signal made of a packet containing the first compression frame signal is produced, and then is recorded in combination with the packet of the digital compression signal; and
   said third signal is produced by deleting a portion of the packets from a series of packets for constituting said first compression frame signal.

2. A digital video signal recording method for recording on a recording medium, a first compression frame signal compressed without using a correlation between frames, and a digital compression video signal having preselected bytes of a packet format constituted by a second compression frame signal compressed with using the correlation between the frames, comprising:
   a signal producing unit for producing a third signal made of a packet containing the first compression frame signal;
   a recording circuit for recording both a packet of said digital compression video signal and a packet of said third signal as a recording signal having a predetermined formal on said recording medium; and
   said signal producing circuit deletes a portion of packets from a series of packets for constituting said first compression frame signal to thereby produce said third signal.

3. A digital video signal recording method for recording on a magnetic recording medium by using a rotary head, a first compression frame signal constructed of a picture compressed without using a correlation between frames; a digital compression video signal having a preselected bytes of a packet format constituted by a second compression frame signal made of a picture compressed using the correlation between the frames; and a third compression video signal having preselectedbytes of a packet format for trick-play reproducing generated from said digital compression video signal; wherein:
   information indicative of a sequence of trick-play reproducing data is added to the third signal, and the resultant third signal is recorded on a predetermined region of a track on the recording medium; and wherein:
   information indicative of a sequence of trick-play reproducing data added to said third compression video signal contains at least information representative of a sequence of said tracks within said predetermined region.

4. A digital video signal recording method as claimed in claim 3 wherein:
   said track is constituted by blocks having a preselected number of bytes; and said sequence of the tracks within said predetermined region is such information indicative of a sequence of the blocks within said predetermine region of said track.

5. A digital video signal recording method for recording on a magnetic recording medium by using a rotary head, a first compression frame signal constructed of a picture compressed without using a correlation between frames; a digital compression video signal having a preselected bytes of a packet format constituted by a second compression frame signal made of a picture compressed using the correlation between the frames; and a third compression video signal having preselected bytes of a packet format for trick-play reproducing generated from said digital compression video signal; wherein:
   information indicative of a sequence of trick-play reproducing data is added to the third signal, and the resultant third signal is recorded on a predetermined region of a track on the recording medium; and wherein:
   information indicative of a sequence of trick-play reproducing data added to said third compression video signal contains at least information representative of a sequence of tracks on the recording medium.

6. A digital video signal recording method as claimed in claim 5 wherein:
   said third signal is formed in such a manner that the same signals are multiplexed to be arranged on n tracks; and the information indicative of the order of tracks is such information representative of a track order in unit of said n tracks.

7. A digital video signal recording method for recording on a magnetic recording medium by using a rotary head, a first compression frame signal constructed of a picture compressed without using a correlation between frames; a digital compression video signal having a preselected bytes of a packet format constituted by a second compression frame signal made of a picture compressed using the correlation between the frames; and a third compression video signal having preselected bytes of a packet format for trick-play reproducing generated from said digital compression video signal; wherein:

information indicative of a sequence of trick-play reproducing data is added to the third signal, and the resultant third signal is recorded on a predetermined region of a track on the recording medium; and wherein:

information indicative of a sequence of trick-play reproducing data added to said third compression video signal contains at least information representative of a sequence in unit of said picture.

8. A digital video signal recording method as claimed in claim 7 wherein:

said picture is constituted by said third signals of different numbers of said tracks; and said information indicative of the sequence in unit of pictures is such information representative of a sequence every plural tracks for constituting said pictures.

9. A digital video signal recording apparatus for recording on a magnetic recording medium by using a rotary head, a first compression frame signal constructed of a picture compressed without using a correlation between frames; a digital compression video signal having a preselected bytes of a packet format constituted by a second compression frame signal made of a picture compressed with using the correlation between the frames; and a third compression video signal having preselected bytes of a packet for trick-play reproducing, generated from said digital compression video signal; wherein:

said digital video signal recording apparatus is comprised of:

signal producing means for producing said third signal; and information adding means for adding information indicative of a sequent of trick-play reproducing data constituting said third compression video signal; and wherein:

said information adding means produces information indicative of at least a sequence of tracks within a predetermined region and adds said information to said third signal.

10. A digital video signal recording apparatus for recording on a magnetic recording medium by using a rotary head, a first compression frame signal constructed of a picture compressed without using a correlation between frames; a digital compression video signal having a preselected bytes of a packet format constituted by a second compression frame signal made of a picture compressed with using the correlation between the frames; and a third compression video signal having preselected bytes of a packet for trick-play reproducing, generated from said digital compression video signal; wherein:

said digital video signal recording apparatus is comprised of:

signal producing means for producing said third signal; and information adding means for adding information indicative of a sequent of trick-play reproducing data constituting said third compression video signal; and wherein:

said information adding means produces information indicative of at least a sequence of tracks and adds said information to said third signal.

11. A digital video signal recording apparatus for recording on a magnetic recording medium by using a rotary head, a first compression frame signal constructed of a picture compressed without using a correlation between frames; a digital compression video signal having a preselected bytes of a packet format constituted by a second compression frame signal made of a picture compressed with using the correlation between the frames; and a third compression video signal having preselectedbytes of a packet for trick-play reproducing, generated from said digital compression video signal; wherein:

said digital video signal recording apparatus is comprised of:

signal producing means for producing said third signal; and information adding means for adding information indicative of a sequent of trick-play reproducing data constituting said third compression video signal; and wherein:

said information adding means produces information indicative of at least a sequence in unit of pictures and adds said information to said third signal.

12. A digital video signal recording method for recording on a recording medium, a first compression frame signal compressed without using a correlation between frames; a digital compression video signal having preselected bytes of a packet format constituted by a second compression frame signal compressed using the correlation between the frames; and a third compression video signal for trick-play reproducing, generating from said digital compression video signal; wherein:

1 frame of said first compression frame signal is constituted by m packets; and in the case that a region for recording thereon said third compression video signal on said recording medium is equal to n packets per 1 track, while said first compression frame signal constituted by said m packets is used as said third compression video signal, a 1 frame signal is arranged in a region for recording thereon said third compression video signal of k tracks being equal to $k \geq m/n$ where k, m and n are integers, and then is recorded on said recording medium.

13. A digital video signal recording method as claimed in claim 12 wherein:

said first compression frame signal constituted by said m packets is arranged as said third compression video signal in a region for recording thereon said third compression video signal of the k tracks being equal to $m/n+1 > k \geq m/n$, and then is recorded on said recording medium.

14. A digital video signal recording method as claimed in claim 13 wherein:

in the case of $k > m/n$, said third compression video signal is not arranged in a final block $(k \times n - m)$ of the region for recording said third compression video signal of a k-th track.

15. A digital video signal recording method as claimed in claim 12 wherein:

packet numbers "m" of 1 frame of said first compression frame signal are different from each other every frame.

16. A digital video signal recording method as claimed in claim 12 wherein:

in the case that the packet numbers "m" of 1 frame of said first compression frame signal are larger than a preselected number (k'×n), only (k'×n) packets among the packets of 1 frame of said first compression frame signal are arranged as said third compression video signal in a region for recording thereon said third compression video signal of k, tracks, and then are recorded in said recording medium.

17. A digital video signal recording method as claimed in claim 12 wherein:

information indicative of a head of said first compression frame signal or said second compression frame signal is added to said digital compression video signal; and said third signal is extracted in unit of a packet from the packet of said digital compression video signal by using said information indicative of said head as a reference to thereby be generated.

18. A digital video signal recording method as claimed in claim 17 wherein:

said digital compression video signal forms a single sequence by said first compression frame signal and said second compression frame signal having a predetermined number of frames, and second information indicative of a head of said sequence is added to said digital compression video signal; and said third compression video signal is extracted in unit of a packet from the packet of said digital compression video signal by using said second information as a reference to thereby be generated.

19. A digital video signal recording method as claimed in claim 18 wherein:

said third compression video signal is arranged by a series of packets defined from a packet containing said second information up to a packet prior to such a packet containing header information for indicating a head of said second compression frame signal.

20. A digital video signal recording method as claimed in claim 12 wherein:

said third compression video signal is recorded in such a manner that the same signals are arranged in a region for recording thereon the third signals of i tracks, where i is an integer equal to or more than 2.

21. A digital video signal recording method as claimed in claim 20 wherein:

said third compression video signal is recorded in such a manner that the same signals are arranged in a region for recording thereon the third compression video signals of continued "i" tracks, and a signal of 1 frame is arranged in a region for recording thereon said third compression video signals of (k×i) tracks.

22. A digital video signal recording method as claimed in claim 12 wherein:

said third compression video signal is arranged by a compression frame signal selected from a series of said first compression frame signal.

23. A digital video signal recording method as claimed in claim 22 wherein:

when an a'-th frame of said first compression frame signal is arranged as said third compression video signal in j (j≧k) tracks to be recorded thereon, an a'-th frame of said first compression frame signal is selected as a third compression video signal subsequent to said third compression video signal, said a'-th frame being present after a time period required to record substantially j tracks from the a-th frame.

24. A digital video signal recording apparatus for recording on a recording medium, a first compression frame signal compressed without using a correlation between frames, a digital compression video signal having preselected bytes of a packet format constituted by a second compression frame signal compressed with using the correlation between the frames, and a third compression video signal for trick-play reproducing, generated from said digital compression video signal, wherein:

frame of said first compression frame signal is constituted by m packets;

said digital video signal recording apparatus is comprised of: a signal producing circuit, when a region for recording thereon said third compression video signal on said recording medium is equal to n packets per 1 track, for producing said first compression frame signal constituted by said m packets as said third compression video signal, and for arranging in a region for recording thereon said third signal of k tracks being equal to k≧m/n, where k, m and n are integers; and a recording circuit for recording a packet of said digital compression video signal and a packet of said third compression video signal as a recording signal having a predetermined format on said recording medium.

25. A digital video signal recording apparatus as claimed in claim 24 wherein:

information indicative of a head of said first compression frame signal, or said second compression frame signal is added to said digital compression video signal; and said signal producing circuit includes a detecting means for detecting the information indicative of said head.

26. A digital video signal recording apparatus as claimed in claim 25 wherein:

said digital compression video signal forms a single sequence by said first compression frame signal and said second compression frame signal having a predetermined number of frames, and second information indicative of a head of said sequence is added to said digital compression video signal; and said signal producing circuit includes a detecting means for detecting said second information.

\* \* \* \* \*